United States Patent
Burr et al.

(10) Patent No.: US 11,255,985 B2
(45) Date of Patent: Feb. 22, 2022

(54) METHOD AND APPARATUS TO USE A BROAD-SPECTRUM ENERGY SOURCE TO CORRECT A NONLINEAR ENERGY RESPONSE OF A GAMMA-RAY DETECTOR

(71) Applicant: CANON MEDICAL SYSTEMS CORPORATION, Otawara (JP)

(72) Inventors: Kent C. Burr, Vernon Hills, IL (US); Xiaoli Li, Vernon Hills, IL (US)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 99 days.

(21) Appl. No.: 16/738,828

(22) Filed: Jan. 9, 2020

(65) Prior Publication Data
US 2020/0379133 A1    Dec. 3, 2020

Related U.S. Application Data

(60) Provisional application No. 62/855,693, filed on May 31, 2019.

(51) Int. Cl.
*G01T 1/29* (2006.01)
*G01T 1/202* (2006.01)

(52) U.S. Cl.
CPC ............ *G01T 1/2921* (2013.01); *G01T 1/202* (2013.01)

(58) Field of Classification Search
None
See application file for complete search history.

(56) References Cited

U.S. PATENT DOCUMENTS

| | | |
|---|---|---|
| 2012/0228484 A1 | 9/2012 | Burr |
| 2015/0160353 A1 | 6/2015 | Wang et al. |
| 2019/0034786 A1 | 1/2019 | Ghawaly, Jr. |
| 2020/0085382 A1* | 3/2020 | Taerum ..................... G06T 7/30 |
| 2020/0289077 A1 | 9/2020 | Bai et al. |

FOREIGN PATENT DOCUMENTS

| | | |
|---|---|---|
| DE | 197 30 242 C1 | 12/1998 |
| EP | 2 867 701 B1 | 9/2018 |
| WO | WO 2018/222755 A1 | 12/2018 |
| WO | WO 2019/081256 A1 | 5/2019 |

OTHER PUBLICATIONS

Extended European Search Report dated Oct. 26, 2020 in corresponding European Patent Application No. 20177562.4, 8 pages.

* cited by examiner

*Primary Examiner* — Edwin C Gunberg
(74) *Attorney, Agent, or Firm* — Oblon, McClelland, Maier & Neustadt, L.L.P.

(57) ABSTRACT

A method and apparatus are provided for positron emission imaging to calibrate energy measurements of a pixilated gamma-ray detector using energy calibration based on a calibration with a distribution energy signature (i.e., having more spectral features than just a single full-energy peak). The energy calibration can be performed using a deep learning (DL) network or a physics-based model. Using the DL network, a calibration spectrum is applied to either generate the measured-signal values of known energy values (e.g., spectral peaks for spectra of various radioactive isotopes) or the parameters of an energy-calibration function/model.

20 Claims, 29 Drawing Sheets

FIG. 9        900
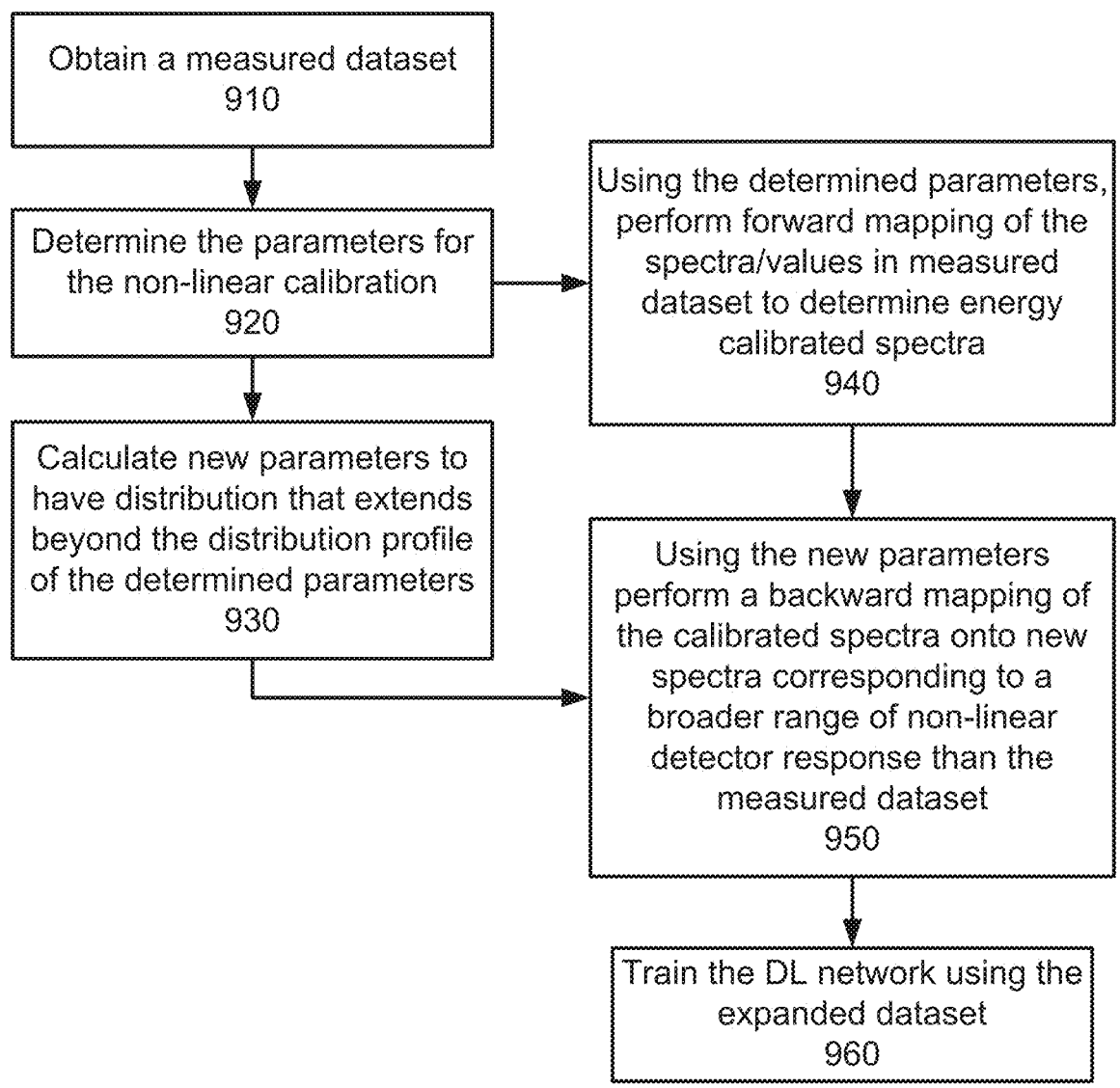

FIG. 20
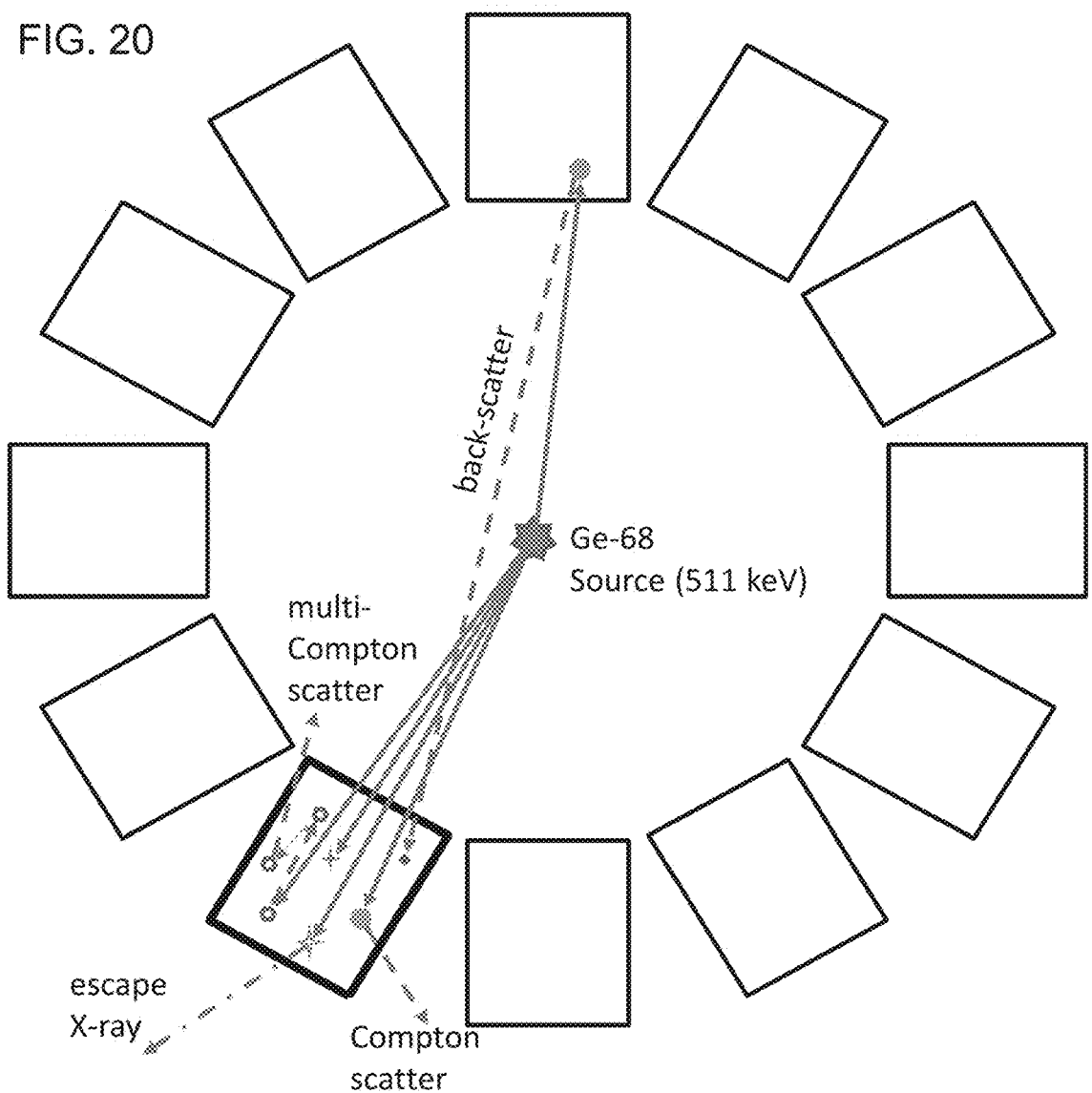
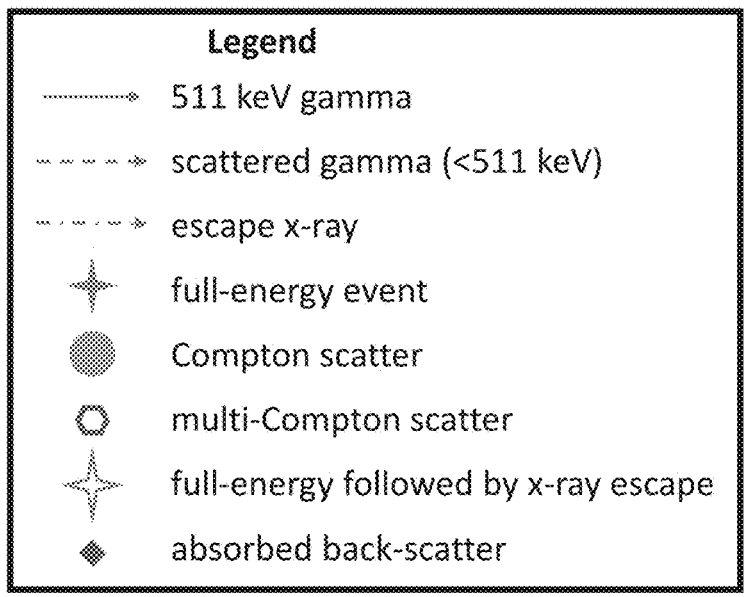

METHOD AND APPARATUS TO USE A BROAD-SPECTRUM ENERGY SOURCE TO CORRECT A NONLINEAR ENERGY RESPONSE OF A GAMMA-RAY DETECTOR

CROSS-REFERENCE TO RELATED APPLICATIONS

This application is based upon and claims the benefit of priority to provisional U.S. Application No. 62/855,693, filed May 31, 2019, the entire contents of which are incorporated herein by reference.

FIELD

This disclosure relates to energy detection in a gamma-ray detector, and, more particularly, to calibrating energy corrections of the gamma-ray detector using a single (or at most a few) energy source having more spectral features than just a single energy peak.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In positron emission tomography (PET) imaging, a tracer agent is introduced into the patient, and the physical and bio-molecular properties of the agent cause it to concentrate at specific locations in the patient's body. The tracer emits positrons, resulting in annihilation events occurring when the positron collides with an electron to produce two gamma rays (at 511 keV) traveling at substantially 180 degrees apart.

PET imaging systems use detectors positioned around the patient to detect coincidence pairs of gamma rays. A ring of detectors can be used in order to detect gamma rays coming from each angle. Thus, a PET scanner can be substantially cylindrical to be maximize the capture of the isotropic radiation. A PET scanner can be composed of several thousand individual crystals (e.g., Lutetium Orthosilicate (LYSO) or other scintillating crystal) which are arranged in two-dimensional scintillator arrays that are packaged in modules with photodetectors to measure the light pulses from respective scintillation events. For example, the light from respective elements of a scintillator crystal array can be shared among multiple photomultiplier tubes (PMTs) or can be detected by silicon photomultipliers (SiPMs) having a one-to-one correspondence with the elements of a scintillator crystal array.

To reconstruct the spatio-temporal distribution of the tracer via tomographic reconstruction principles, each detected event is characterized for its energy (i.e., amount of light generated), its location, and its timing. By detecting the two gamma rays, and drawing a line between their locations, i.e., the line-of-response (LOR), one can determine the likely location of the original disintegration. The timing information can also be used to determine a statistical distribution for the annihilation along the LOR based on time-of-flight (TOF) information of the two gamma rays. By accumulating a large number of LORs, tomographic reconstruction can be performed to determine a volumetric image of the spatial distribution of radioactivity (e.g., tracer density) within the patient.

Single-photon emission computed tomography (SPECT) is similar to PET except a collimator is used to restrict the solid angle of gamma rays incident on the respective detector elements (e.g., the respective elements in the scintillator crystal array), making reconstruction possible using single gamma-ray detection events as opposed to requiring coincidences to determine a LOR.

In addition to position information (e.g., the LOR) and timing information (e.g., the TOF), detectors in PET and SPECT systems can also acquire and use energy information in the image reconstruction process. Energy calibration is important for all PET detectors. For example, proper energy calibration allows energy cuts to be made to greatly reduce the contribution of scatter to the final image.

In many PET detectors, the energy response of the detector is nearly linear. In these cases, energy calibration can be done using a single energy. Often, the chosen energy is 511 keV (e.g., using germanium isotope 68 (Ge-68) as the radioactive source to calibrate the energy), since the energy of interest in PET is 511 keV. In the case of linear response, the energy calibration consists of determining a scale factor that translates the measured signal level corresponding to 511 keV gamma rays to a desired target value.

However, energy measurements can deviate from an ideal linear response due to nonlinearities in the measurement process and/or practical considerations related to, e.g., light/charge sharing among channels during a multi-channel gamma-ray detection (e.g., due to the gamma-ray energy being absorbed in multiple detectors/channels as can happen due to Compton scattering). Accordingly, improved techniques are desired to correct energy measurements in pixelated gamma-ray detectors.

BRIEF DESCRIPTION OF THE DRAWINGS

A more complete understanding of this disclosure is provided by reference to the following detailed description when considered in connection with the accompanying drawings, wherein:

FIG. 9 shows a flow diagram for a method 900 for augmenting the training dataset used to train a deep-learning (DL) network, according to one implementation;

FIG. 20 shows a schematic diagram of scattering processes in an imaging scanner in the presence of a radiation source emitting radiation of a single energy, according to one implementation;

DETAILED DESCRIPTION

Figure 1A:
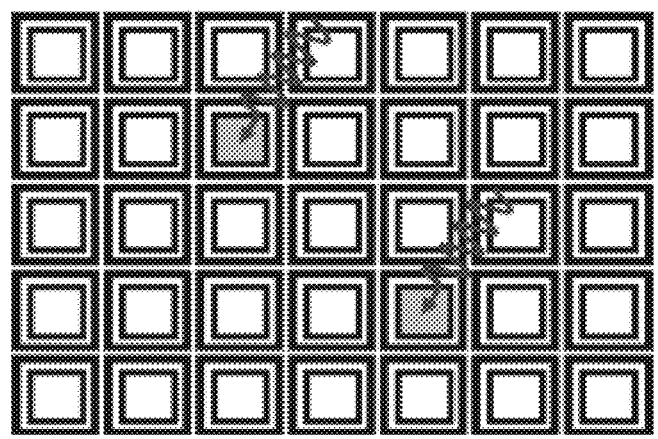
FIG. 1A shows a diagram a silicon photomultiplier (SiPM) detector with two optical photons incident on respective microcells, according to one implementation.

Certain implementations of both PET and SPECT imaging (e.g., time-of-flight PET) can depend on the ability to determine the position, time, and energy of detected gamma rays. For example, time and energy windowing can be used to distinguish scattered and random gamma rays from coincident gamma rays originating from the same positron annihilation event. Thus, the reliability of the coincidence discrimination can depend on the accuracy of the timing and energy calibrations.

Accordingly, improved energy calibrations for gamma-ray detectors are desired. However, these improved methods should avoid if possible increasing the time and expense of the energy calibrations. For example, the improved method should if possible reduce the number of energy calibration sources and the number of steps in the calibration procedure. That is, the improved calibration method should strive to both provide more accurate energy calibrations while also being more efficient with respect to both time and cost.

Further, energy calibrations of the radiation detectors can benefit other modalities of medical imaging and other applications of ionizing radiation detection. Although the calibration methods are illustrated in the non-limiting context of PET and SPECT medical imaging, the methods described herein are applicable to other applications that benefit from energy calibration of ionizing radiation detectors. For example, ionizing radiation detectors can be used for nuclear non-proliferation detection and monitoring (e.g., at security check points, such as at points of entry into a country). In addition to homeland security applications, ionizing radiation detectors can be used in oil-well logging or other commercial and industrial applications. Ionizing radiation detectors for these applications can also benefit from energy calibrations using the methods described herein, and energy calibration of the ionizing radiation detectors for these applications is within the scope of this disclosure. In medical imaging, for example, X-ray computed tomography (CT) is performed using either indirect detection (e.g., an X ray interacts with a scintillator crystal to generate optical photons, and the optical photons are converted into an electrical signal using a photodetector) or direct detection (e.g., a cadmium zinc telluride (CZT)). Like the gamma-ray detectors discussed in the illustrative examples below, these X-ray detectors can also be calibrated using a straightforward generalization of the methods described herein, as would be understood by a person of ordinary skill in the art.

As discussed above, the detector response/output as a function of the input energy (i.e., the actual energy of the incident/primary gamma ray) can deviate from an ideal linear response due to various practical considerations. Accordingly, the methods and apparatus described apply improved approaches and techniques to correct energy measurements to generate corrected energy values that are substantially linear.

There can be many sources of nonlinearity in the gamma-ray detection process. For example, the use of silicon photomultipliers (SiPMs) as the photosensor in scintillator-based gamma-ray detectors and the time-over-threshold (ToT) method for amplitude estimation can both result in significant energy nonlinearity. Correcting this nonlinearity is important for achieving accurate energy information and sufficient energy resolution for gamma rays that deposit energy in multiple crystals through a combination of Compton scattering and photoelectric absorption.

Commercial positron emission tomography (PET) systems can use arrays of scintillator crystals to detect gamma rays having energies of 511 keV that are generated by positron-electron annihilation. These PET systems can provide both energy and position information. Sometimes the energy of a gamma ray can be shared by two crystals due to inter-crystal scattering (e.g., Compton scattering). When the energy from a single gamma ray is detected at more than one crystal/channel, the detection event can be referred to as "multi-channel detection." The total energy of a scattering event can be recovered by adding individual energies from all involved crystals (the respective crystals and their corresponding photodetectors, amplifiers and electronics can also be referred to as "channels"). The summing can be realized either through analogue or digital methods depending on the choice of readout and electronics.

The energy deposited in a crystal can be converted to an electrical signal, and the electrical signal can then be digitized. This digitization process can be performed by various methods. Among the methods for digitizing the energy measurements of gamma rays, the time-over-threshold (TOT) method has the advantages of being very cost effective and can be easily applied to applications requiring high channel density. Although the TOT value is a monotonically increasing function of the absorbed energy in a given channel, the relation between the TOT and the actual energy can deviate from being perfectly linear. This nonlinear detector response and/or other nonlinear detector responses can be corrected using the methods described herein.

As discussed above, the accuracy of image reconstruction using positron emission tomography (PET) or single-photon emission computed tomography (SPECT) can depend on the resolution and accuracy of the energy calibration of the gamma-ray detectors. The methods described herein provide an improved method for energy calibration of gamma-ray detectors.

When a detector's sensitivity element is a crystal array, inter crystal scattering, light sharing, and charge sharing can result in the energy of the incident gamma ray being shared between multiple crystals/readout channels. That is, each of the channels that share the energy detects a fraction of the total energy of the gamma ray. Therefore, to cover the entire range over which energy values can be measure, the energy calibration of the gamma-ray detector should span a range extending from the energy of a positron emission gamma ray (i.e., 511 keV) to lower energies (e.g., the calibration range of the detector can extend down to minimum detection threshold below which signals are treated as being noise and ignored). Calibrating over such an extended range of interest enables accurate representation of the energy values detected during multi-channel detection, which results from the above-noted charge sharing mechanisms (e.g., Compton scattering).

In general, the energy response of a gamma-ray detector will exhibit some degree of nonlinearity. One method to calibrate a detector's energy response over a broad range of energies is to use multiple sources (e.g., different isotopes) emitting different energies. For example, external gamma-ray sources or radiation background from the crystal can be used to provide gamma rays with different energies.

In contrast to multi-source calibration methods, the methods described herein use an ionizing radiation source with an energy signature that spans many different energies (e.g., many discrete energies and/or a continuum of energies). Accordingly, the energy calibration of a broad range of energies can be performed using a single radiation source or in some implementations a few radiation sources (e.g., two radioactive sources). The spectrum produced by Lu-176 is appropriate for such a calibration because it spans a range of energies and includes many spectral features. Lutetium is an element commonly found in scintillator materials. A small percentage of naturally occurring lutetium is the radioactive isotope Lu-176. When lutetium is used as one of the constituents of a scintillator material, the decay of the Lu-176 produces a background spectrum. Since the Lu-176 in this case is contained in the scintillator itself, the radiation producing this background spectrum is often referred to as intrinsic radiation.

For example, gamma-ray detectors using silicon photomultipliers and time-over-threshold amplitude estimation exhibit significant energy nonlinearity. In certain implementations, the methods described herein use an artificial neural network (ANN) to extract nonlinearity correction factors from a single Lu-176 background spectrum, according to a non-limiting embodiment. In certain implementations of the methods described herein, the ANN is trained using a training dataset in which the input data is Lu-176 background spectra and the target data of multiple peak positions derived from multiple individual isotope spectra. For positron emission tomography (PET) detectors using lutetium (Lu)-based scintillators, this method has several advantages. First, when the energy calibration is performed using only the Lu-176 background spectrum, the methods described herein require no external radiation sources. Second, the ANN can be performed extremely fast. Third, the methods described herein can provide better quantitative results than traditional least-squares fitting to a multi-parameter function.

Figure 1B:
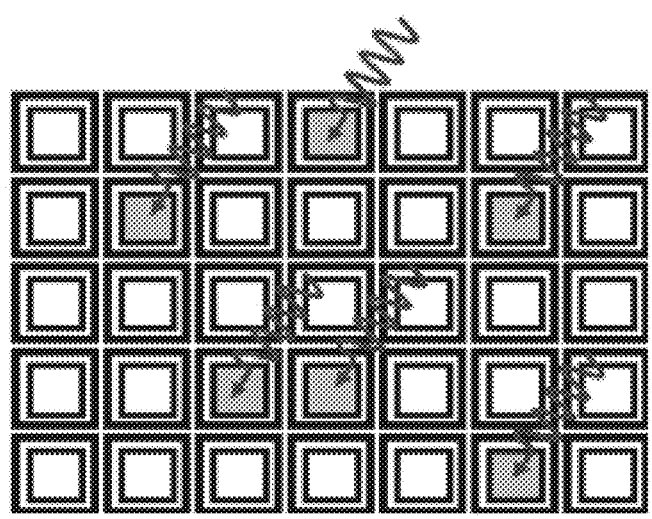
FIG. 1B shows a diagram the SiPM detector with six optical photons incident on the respective microcells, according to one implementation.
Figure 1C:
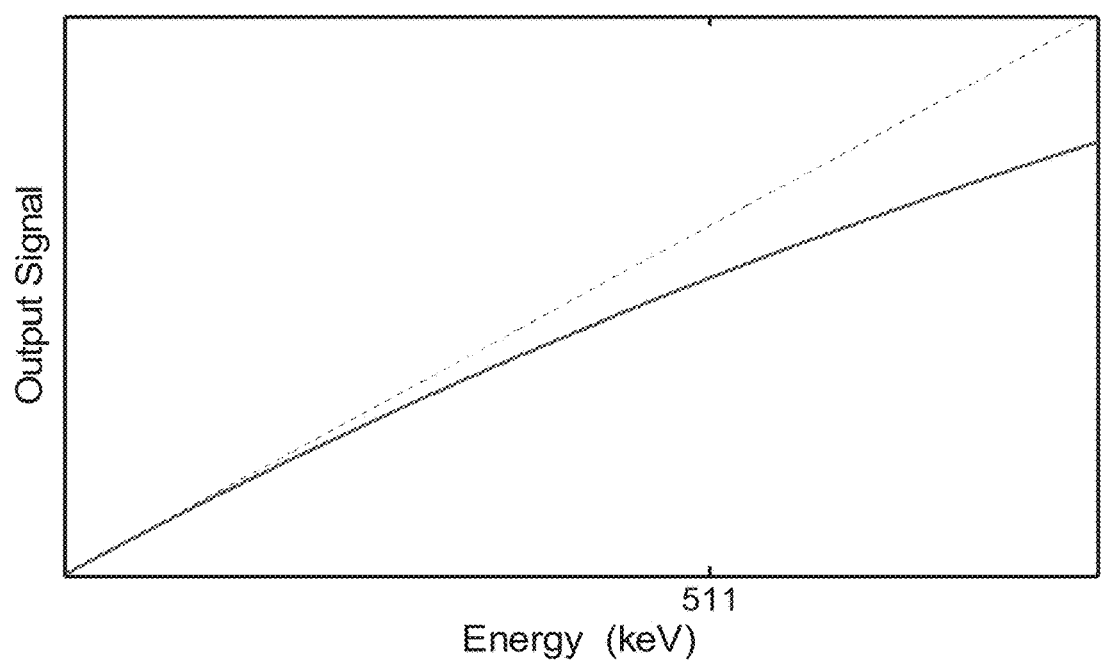
FIG. 1C shows a nonlinear energy response of the SiPM detector, according to one implementation.
Figure 2A:
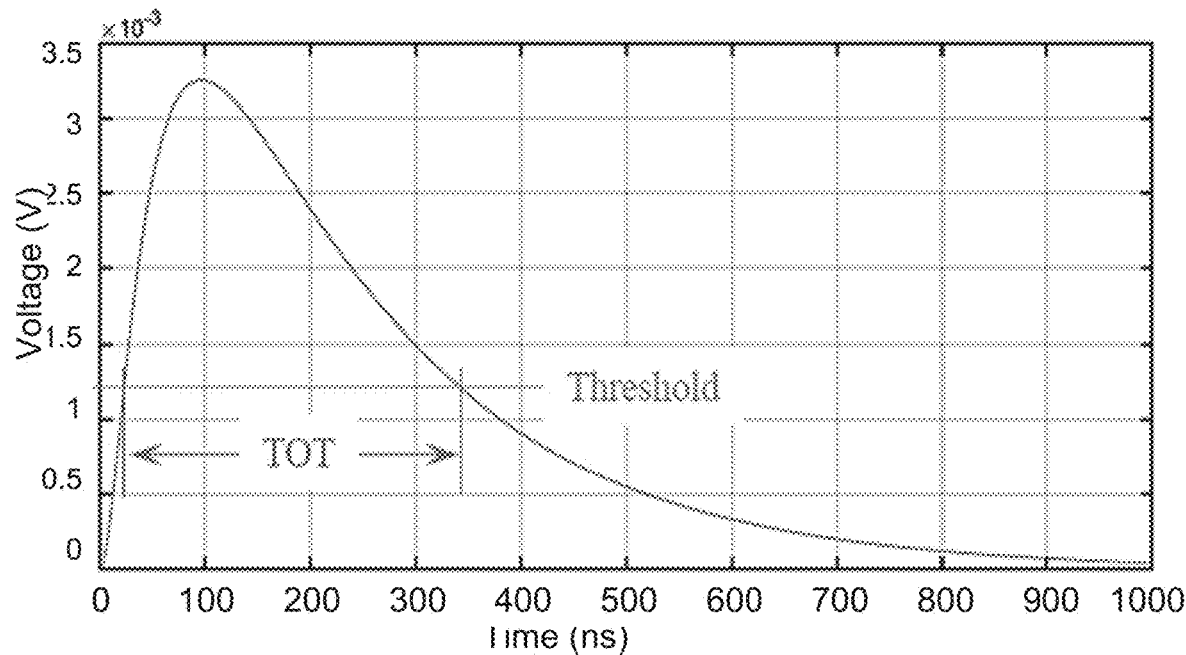
FIG. 2A shows a plot of a time-over-threshold (TOT) measurement, according to one implementation.
Figure 2B:
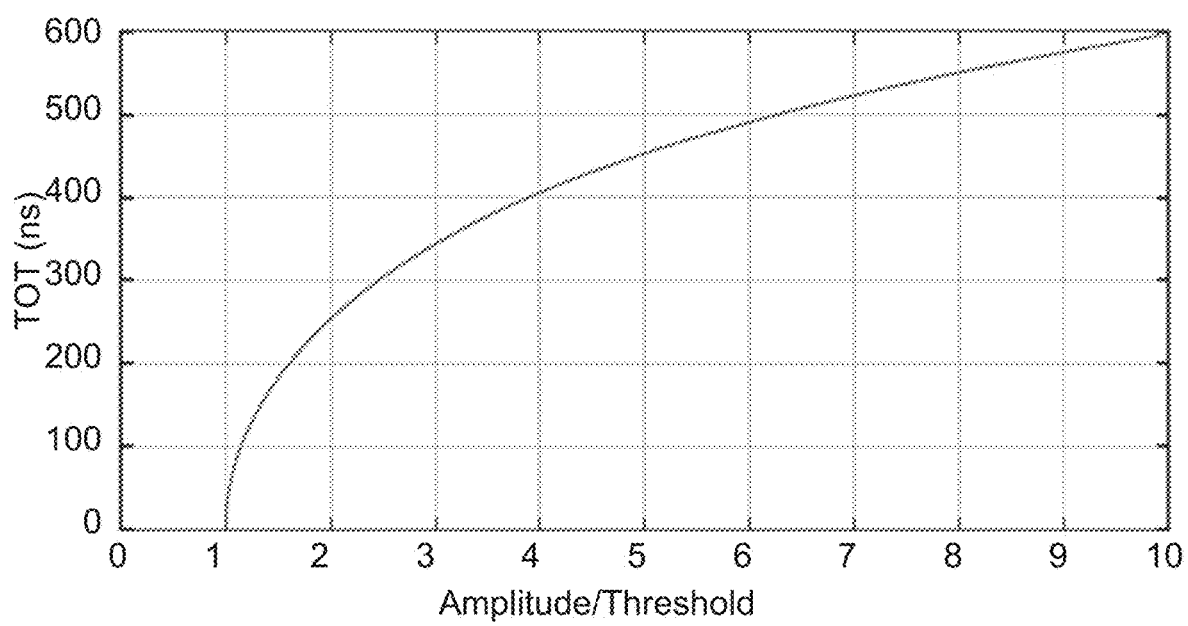
FIG. 2B shows a plot of the TOT as a function of the ratio peak height to the threshold, according to one implementation.

Referring now to the drawings, wherein like reference numerals designate identical or corresponding parts throughout the several views, FIGS. 1A-1C illustrate a first source of nonlinearity, which arises in silicon photomultiplier (SiPM), and FIGS. 2A and 2B illustrate a second source of nonlinearity, which arises when time-over-threshold (TOT) values is used as a measure of gamma-ray energy.

FIG. 1A shows a SiPM detector in a low-flux case in which two photons are incident on two micro-cells within the two-dimensional (2-D) array of 35 micro-cells (i.e., five micro-cells by seven micro-cells). Often, a SiPM detector will have several thousand micro-cells, but here a reduced number of micro-cells is used as a simplified example for illustrative purposes. FIG. 1B shows the SiPM detector in a medium-flux case in which six photons are incident on six of the 35 micro-cells. The SiPM is a photodetector formed as a 2-D array of tiny Geiger-mode avalanche photodiodes (G-APD) elements, which are referred to as microcells. This architecture overcomes the disadvantage of a single G-APD because the amplitude of the output pulse of a SiPM is proportional (over some range of intensities) to the number of photons incident on the surface of the device. However, when the photon flux becomes high enough that the probability two photons being incident at the same micro-cell is no longer negligible, then the signal as a function of the number of incident photons begins to roll over, becoming nonlinear. This nonlinearity is illustrated in FIG. 1C in which the gamma-ray energy, which is represented along the horizontal axis, is proportional to the number of optical photons incident on the SiPM. In PET detectors, the optical photon flux can be high (e.g., thousands of optical photons generated per 511 keV gamma ray), necessitating a large dynamic range for the SiPMs.

As previously discussed, the output signal of a SiPM is the sum of the signals of the firing micro-cells, and the output signal is therefore correlated to the number of incident photons. The dynamic range is determined by the number of cells in the device, and linearity of the SiPM signal with light intensity is only maintained as long as no more than one optical photon interacts per SiPM cell. At higher light intensities where this condition is violated, there will be saturation of the signal leading to nonlinearity with the incident light levels. In the case of PET, this will result in a nonlinearity between the detector signal and the energy deposited in the scintillator, thus degrading the ability to reject Compton-scattered annihilation photons based on their energy loss, or to reject pulse pile-up due to two annihilation photons interacting in the same scintillator element at the same time.

FIG. 2A shows a plot of a pulse from the detection of a gamma ray with the voltage plotted along the vertical axis and time plotted along the horizontal axis. Further, FIG. 2A shows a predefined threshold at about 1.2 millivolts, and the duration of time that the pulse exceeds this threshold is the TOT value. As illustrated in FIG. 2B, the TOT value is monotonically related to the energy of the detected gamma ray, which can be represented by the area under the curve of the pulse, or by the amplitude of the pulse. For signals below the threshold no signal/detection is registered.

In addition to the above-illustrated detector-saturation nonlinearity and the TOT nonlinearity, PET detectors can suffer from additional sources of nonlinearity. Regardless of the source or type of nonlinearity, the calibration methods described herein is general, and can be applied to any and all detector nonlinearities regardless of the source of the nonlinearities. That is, although detector saturation and TOT nonlinearities are used for illustrative purposes herein, these examples of PET detection nonlinearities are not limiting.

The errors introduced by nonlinearities can be compounded by multi-channel detection events, which occur when the energy from a single gamma ray is shared and then detected among multiple detector elements (e.g., by Compton scattering, optical cross-talk, etc.). Although the total energy can be recovered by determining which detection events are multi-channel events, and then identify groups of multi-channel events arising from the same gamma ray (e.g., based on the coincidence of their detection times, spatial proximity, and/or respective energies). Then the measured energies from all of the events arising from the same gamma ray can be summed to aggregate the shared energies and reassemble the total energy of original gamma ray. That is, respective energies from the detector amongst which the energy was shared are summed to determine the total energy of the gamma ray. Without correcting for the nonlinearities, summing the raw energy signals will result in a total energy value that differs (e.g., is greater than) would be registered if the energy were measured as a single-channel detection event, as shown in FIG. 3.

Figure 3:
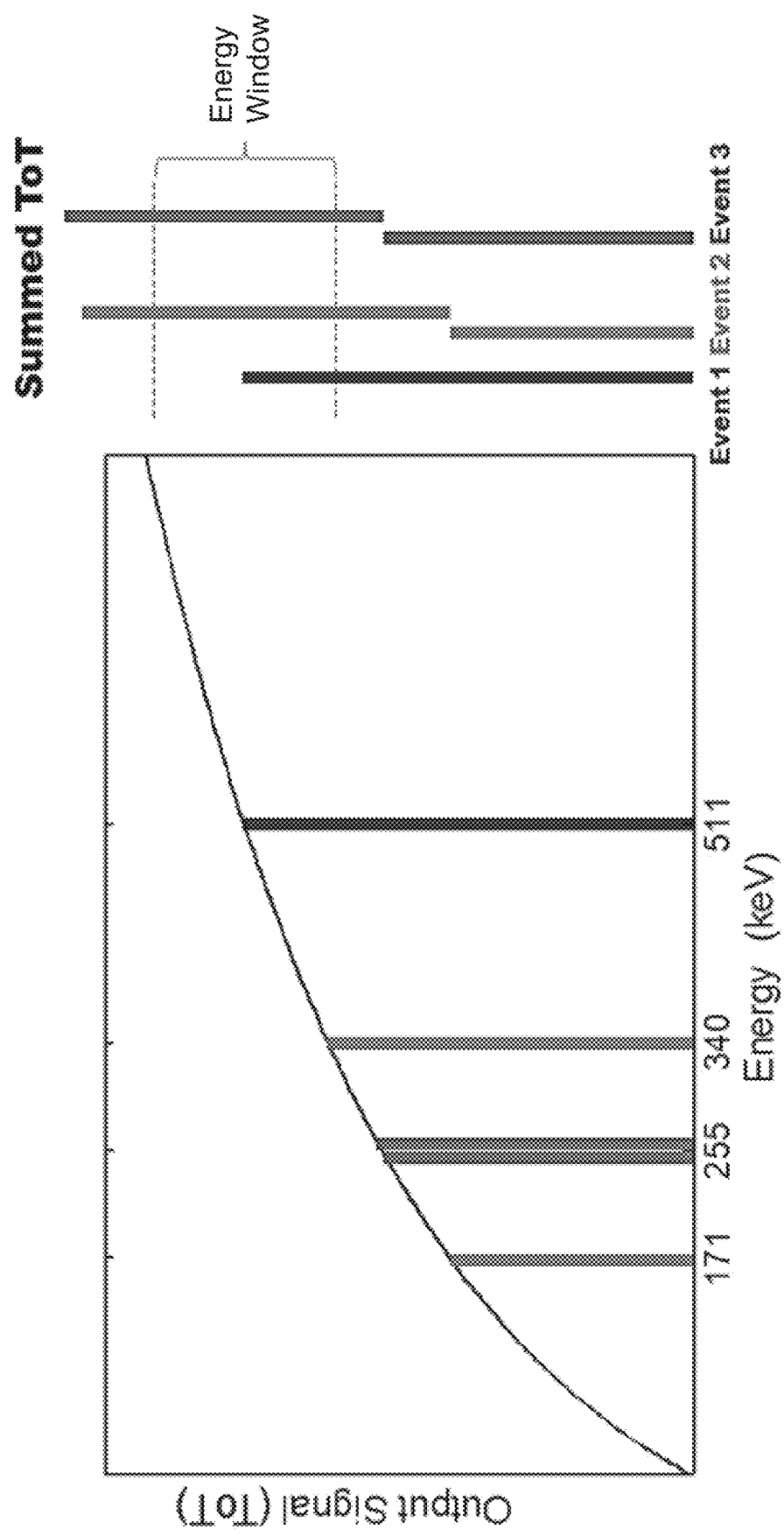
FIG. 3 shows how the raw measured energies for one-channel detection events differ from the sum of the raw measured energies of two-channel detection events, according to one implementation.

In particular, FIG. 3 illustrates the case of the nonlinearity arising from TOT measurements, contrasting single-channel events with multi-channel detection events. Event 1 is a single-channel detection event in which the entire gamma-ray energy of 511 keV is deposited in a single crystal. To the right is shown an energy window, which is centered on the 511 keV energy of gamma rays from positron-electron annihilation. Events 2 and 3 correspond to two-channel detection events in which two crystals each detect a portion of the total 511 keV energy of the gamma ray.

In event 2, 171 keV is detected by a first crystal, and 340 keV is detected by a second crystal (i.e., the total energy is 171 keV+340 keV=511 keV). In event #3, the first and second crystals absorb/detect energies of 255 keV and 256 keV, respectively. As shown on the right-hand-side of FIG. 3, without a nonlinearity correction, the sum of the energies for each of events #2 and #3 fall outside the designated energy window. Although both events deposit a total of 511 keV, the absence of a nonlinearity correction to the measured signals results in their summed-signals being much greater than would be registered for single-channel detection of 511 keV, and therefore the events would be discarded, resulting in reduced sensitivity.

For example, it is not uncommon for 65% of the detection events in the a scintillator and SiPM-based gamma-ray detector to be single crystal/single channel detection events, with Compton scattering causing 30% of detected gamma rays to be two-channel detection events and 5% to be three-channel detection events. In this case, excluding the multi-channel detection events reduces the singles count rate to 65% efficiency, and reduces the coincidence count rate to 42% efficiency. Because PET imaging relies on coincidence detection to determine the line of response (LOR), excluding the multi-channel detection events reduces the overall sensitivity by more than 50%.

As used herein, the term "energy" is not restricted to mean a calibrated energy that is linearly related to the actual or true energy. In general, the term "energy", as used herein, specifies an energy coordinate that represents and is related monotonically to the actual or true energy. Thus, the term "energy" does not necessarily refer to actual or true energy, unless context clearly indicates otherwise.

For example, when the summing of energies is discussed herein, this summing can be performed on "energy coordinates," rather than a calibrated value that is linearly related to the actual energy. The relation of the measured/raw energy $E_{raw}$ (i.e., "energy coordinates") can be related to the true energy $E_{true}$ by a nonlinear function $E_{true}=f(E_{raw})$ and the inverse function can be applied to map from the true energy to the measured, raw energy value according to $E_{raw}=f^{-1}(E_{true})$. Because the relation between measured, raw energy to the true energy is nonlinear, the sum of two measured energies $f^{-1}(E_1)$ and $f^{-1}(E_2)$ from two-channel detection does not equal the measured/raw energy for an equivalent single-channel detection, i.e., $f^{-1}(E_1)+f^{-1}(E_2) \neq f^{-1}(E_1+E_2)$, wherein $E_1+E_2=E_{Total}$, and $E_{Total}$ is the true energy of the incident, e.g., 511 keV. Accordingly, to accurately compare the energies of multi-channel detections with signal-channel detections, an energy calibration and correction is applied individually to each of the energies before summing the energies of the multi-channel detections.

As discussed above, the methods described herein can be better understood by contrasting them with related calibration methods that use many discrete sources and isotopes for energy calibration. For example, these related methods for calibrating the nonlinearity involve making measurements with multiple isotopes to derive the spectral positions of multiple energies covering the range of intended use. In a production or clinical setting, the use of this method is undesirable because frequently replacing multiple isotopes is expensive and the measurements are time consuming and tedious.

Figure 4:
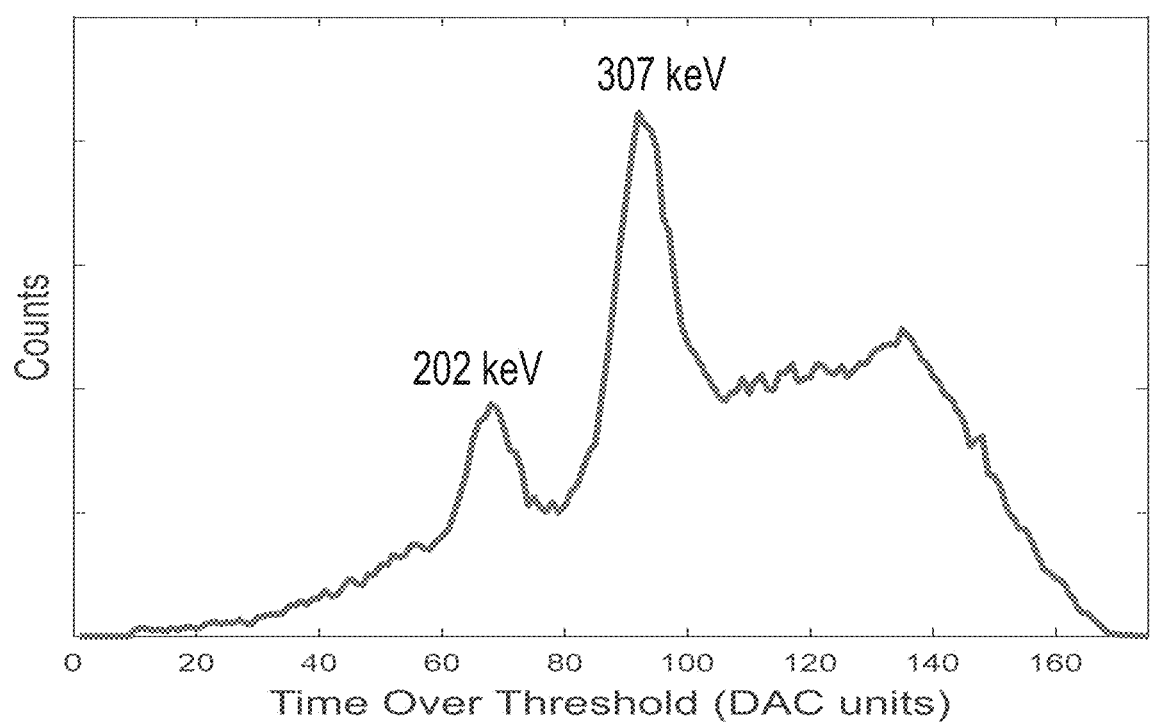
FIG. 4 shows a lutetium isotope 176 (Lu-176) spectrum plotted as a function of the TOT signal, according to one implementation.

To overcome the limitations of the related many-source calibration methods, the methods described herein leverage the fact that PET scanners can be fabricated using lutetium (Lu)-based scintillators. Lu-176 present in the scintillators provides a source of background radiation that can be used for calibration and/or daily quality control. Using the Lu-176 background spectrum for energy nonlinearity calibration could replace routine energy nonlinearity calibration using multiple isotopes. FIG. 4 shows a plot of the Lu-176 background spectrum in which the TOT value is represented along the horizontal axis and number of counts is represented along the vertical axis. As can be seen, the Lu-176 background spectrum has a significant amount of structure. Accordingly, one approach for nonlinearity calibration is to use fitting techniques to determine parameter values (some of which would describe the nonlinearity) that give the best match between the measured spectrum and a parameterized model. Some challenges faced by this approach are that this approach can be time-consuming, and for this approach to be robust the parameterized model should provide a reasonable fit over all conditions. These challenges are overcome to achieve a faster, more robust approach by using an artificial neural network (ANN) to learn nonlinearity correction coefficients from measured Lu-176 spectra.

Figure 5:
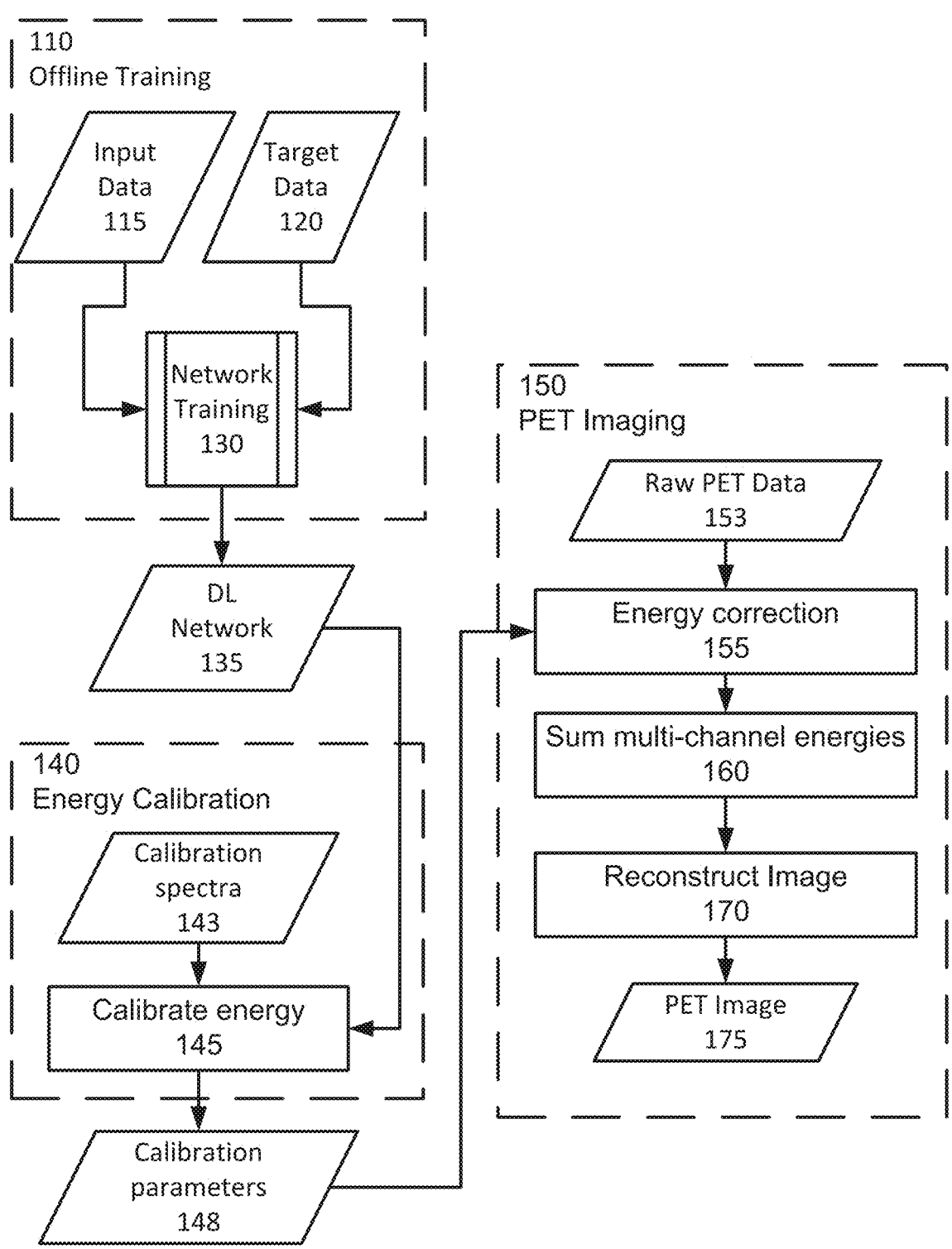
FIG. 5 shows a flow diagram for a method 100 for performing an energy calibration and reconstructing a positron emission tomography (PET) image, according to one implementation.

FIG. 5 shows a flow diagram of method 100, which has three processes: (i) a process 110 for offline training, (ii) a process 140 for determining the energy calibration, and (iii) a process 150 for applying the energy correction to raw emission data and reconstructing a PET image from the corrected emission data. Process 110 can be performed less frequently than process 140, and process 140 can be performed less frequently than process 150. For example, in one non-limiting implementations, process 110 can be performed once and the resultant DL network 135 can be used in several different PET scanner. Also, in one non-limiting implementations, process 140 can be performed once for each different PET scanner and the resultant energy calibration parameters 148 can be used in several different scans by the respective PET scanner.

Figure 6:
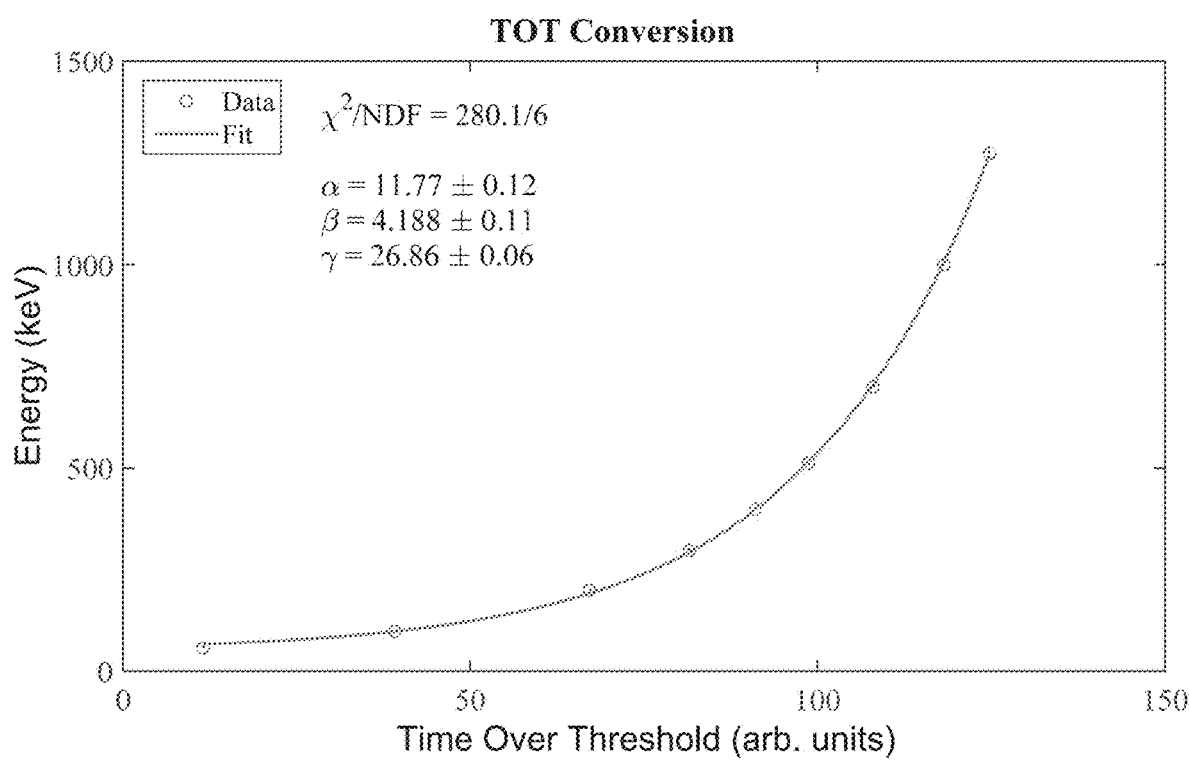
FIG. 6 shows a plot of an energy-calibration model being curve fit to energy calibration data, according to one implementation.

The process 110 of method 100 performs offline training of the DL network 135. In process 130 of process 110, input data 115 and target data 120 are used as training data to train a DL network 135, resulting in the DL network 135 being output from process 130. For example, the input data 115 can be acquired Lu-176 spectra, and the target data 120 can be parameters of an energy-calibration model. FIG. 6 shows an example of energy-calibration model directed to correcting for the nonlinearity in the Time-over-Threshold (TOT) technique. In this case, the functional form selected to fit the data is $$E = f(x, \vec{p}) = \alpha(\beta + e^{x/\gamma}),$$

wherein x is the TOT value and $\vec{p} = \{\alpha, \beta, \gamma\}$ are the parameters of the functional form, which are to be adjusted in order to obtain the best fit. Here, method 100 is illustrated using the non-limiting example that the target data are the parameters $\vec{p}$ of an energy-calibration model. The method 100 is not limited to the energy-calibration model having the particular functional form provided above. In other implementations, the target data can take other forms without departing from the spirit of the invention.

In process 130, the respective Lu-176 spectra of the input data 115 are applied as inputs to the DL network 135 in order to calculate corresponding sets of parameters as outputs from the DL network 135. Using an iterative training process such as the backpropagation method, the coefficients of the DL network 135 are adjusted and trained to generate sets of parameters that match the corresponding parameters in the target data 120.

In process 140 of method 100, the step 145 applies energy calibration data 143 as an input to the trained DL network 135 to generate an energy calibration parameters 148.

At step 145, one or more calibration spectra 143 are applied to the raw data 153. For example, the measured Lu-176 spectrum 143 is applied as an input to the DL network 135 to generate the energy calibration parameters 148 (e.g., the parameters $\vec{p}$ of the energy-calibration model f).

In process 150 of method 100, the raw data 153 is corrected in step 155 using the energy calibration parameters 148. Then in step 160, the energies for the multi-channel events are summed (optional). Finally, in step 170, a PET image 175 is reconstructed from the corrected emission data using an image reconstruction process (e.g., an inverse Radon transformation).

At step 155, an energy calibration is applied to the raw data 153. For example, the parameters $\vec{p}$ generated by the DL network 135 are applied together with energy signals x (also referred to as energy coordinates) as inputs to the energy-calibration model f to generate calibrated energy values $E = f(x, \vec{p})$.

FIG. 6 shows a non-limiting example of a parameterized curve of the nonlinear detector response with respect to energy. As shown, the nonlinear detector response can be parameterized by assuming a functional form defined by a few parameters (e.g., the variables α, β, and γ), and then curve fitting the data to find the of the parameter values for which the energy-calibration model f best matches the data (e.g., by minimizing the mean square error between the energy-calibration model f and the calibration data).

Generally, the shape of the nonlinear response will be similar among detector elements/channels, albeit with some variations. To account for these variations, the parameters can be calibrated for each readout channel/module.

As discussed above, the energy-calibration model f is not limited to a functional form of $$E = f(x, \vec{p}) = \alpha(\beta + e^{x/\gamma}).$$

For example, as an alternative to a functional-form parameterization, the parametrization can be expressed using parameters in a Look-Up-Table (LUT). In one implementation, e.g., a LUT can relate discrete points for the mapping $E_i = f(x_i)$, and interpolation can be used to determine the mapping for points in between the discrete points.

Accordingly, in certain implementations, rather than using a functional form, the nonlinearity correction can be specified by a LUT, in which the LUT specifies correction factors corresponding to specific signal levels. Correction factors for signal levels which do not appear in the LUT can be determined by interpolation or extrapolation from values which do appear in the LUT. Different methods of interpolation (e.g. spline, linear, or cubic) can be used depending on accuracy and computational complexity constraints. Similarly, the number of signal levels in the LUT can depend on the accuracy and computational complexity constraints. Generally, a larger number of values will result in improved energy resolution (i.e., accuracy of correction). For the case of a LUT approach, every correction factor in the LUT can be a respective parameter that is determined by the energy calibration.

As discussed above, the energy calibration can include TOT nonlinearity corrections, but is not limited to TOT nonlinearity corrections. Additionally, the energy calibration can account for nonlinearities due to charge sharing, thresholding, and other nonlinear effects. Further, the energy calibration can be a lookup table indexed by the positions/identities (IDs) of respective detector elements to obtain parameters of an equation expressing a nonlinear correction. Accordingly, the parameterization of the energy calibration can be performed on a detector element by detector element basis.

At step 160, the detection events corresponding to multi-channel events are discriminated, and then the energies are summed to determine the total energy for each multi-channel detection event. Details for one implementation of this process are provided below. Step 160 is optional and can be omitted in certain implementations.

At step 170, a PET image 175 is reconstructed from the correct PET data using any known reconstruction method. For example, the PET data 153 can be used to reconstruct an image of radioactivity level (e.g., tracer density) as a function of voxel position. The image reconstruction can be performed using a back-projection method, a filtered back-projection method, a Fourier-transform-based image reconstruction method, an iterative image reconstruction method, a matrix-inversion image reconstruction method, a statistical image reconstruction method, a list-mode method, or other reconstruction method or combination thereof, as would be understood as a person of ordinary skill in the art. For example, the PET image 175 can be reconstructed using an ordered subset expectation maximization (OS-EM) algorithm that is initialized with an FBP reconstructed PET image.

Returning to step 160, the raw data 153 can include energies, times, and positions corresponding to gamma-ray detection events. For example, the detection events can correspond to pairs of gamma rays emitted during a positron-electron annihilation event occurring in an object OBJ. The detection events can be detected at any one of a plurality of detector elements. When multi-channel detection occurs, the energy from a single gamma ray is distributed and detected among two or more detector elements. These two or more detector elements can be within a single detector module (e.g., adjacent detector elements), or can be distributed among two or more detector modules. For example, in Compton scattering, the scattered gamma ray can traverse several detector elements before being absorbed in a second detector element far from the first detector element at which Compton scattering occurred.

At step 160, the multi-channel detection events are identified from the energy corrected emission data 153 multi-channel detection events, and then the identified multi-channel detection events are grouped by event. That is, each of the groups corresponds a single primary gamma ray. For first-order scatter, each group will include two hits: one hit being the energy detected in the first crystal at which Compton scattering occurred, and the other hit being the energy detected in the second crystal at which the scattered gamma ray is absorbed via the photoelectric absorption. Similarly, each group for a second-order scatter event will include three hits (i.e., one for the primary gamma ray and two for each of the two scattered gamma rays), and so forth (e.g., four hits in groups corresponding to third-order scatter, etc.).

Multi-channel events can be selected, e.g., based on the detection signals' proximity in time, based on the detection signals' proximity in space, based on the sum of the energies of the signals, or based any combination thereof. For example, if the gamma-ray source has a known energy (e.g., 511 keV for gamma rays from positron annihilation), then the more closely the signals sum to the known energy the more likely the signals correspond to a same multi-channel event. Further, signals occurring closer together in time are more likely to correspond to a same multi-channel event, and signals occurring closer together in space are more likely to correspond to a same multi-channel event. Moreover, when all three of the above conditions (i.e., energy, time, and space) are all satisfied, then the signals are even more likely to correspond to a same multi-channel event. Thus, the processing to group signals into multi-channel events can be performed using a multivariate statistical analysis.

In addition to the above implementation in which parameters of the energy-calibration model f are output directly from the DL network 135, energy calibration can be performed using a second embodiment in which the DL network 135 outputs the energy signal values (e.g., energy coordinates) corresponding to a particular set of energies (e.g., the energies of gamma rays emitted by select isotopes). Then in a following step, the energy coordinates are used to determine the parameters $\vec{p}$ by curve fitting the energy-calibration model f to the energy signal/coordinate values output from the DL network 135.

Figure 7A:
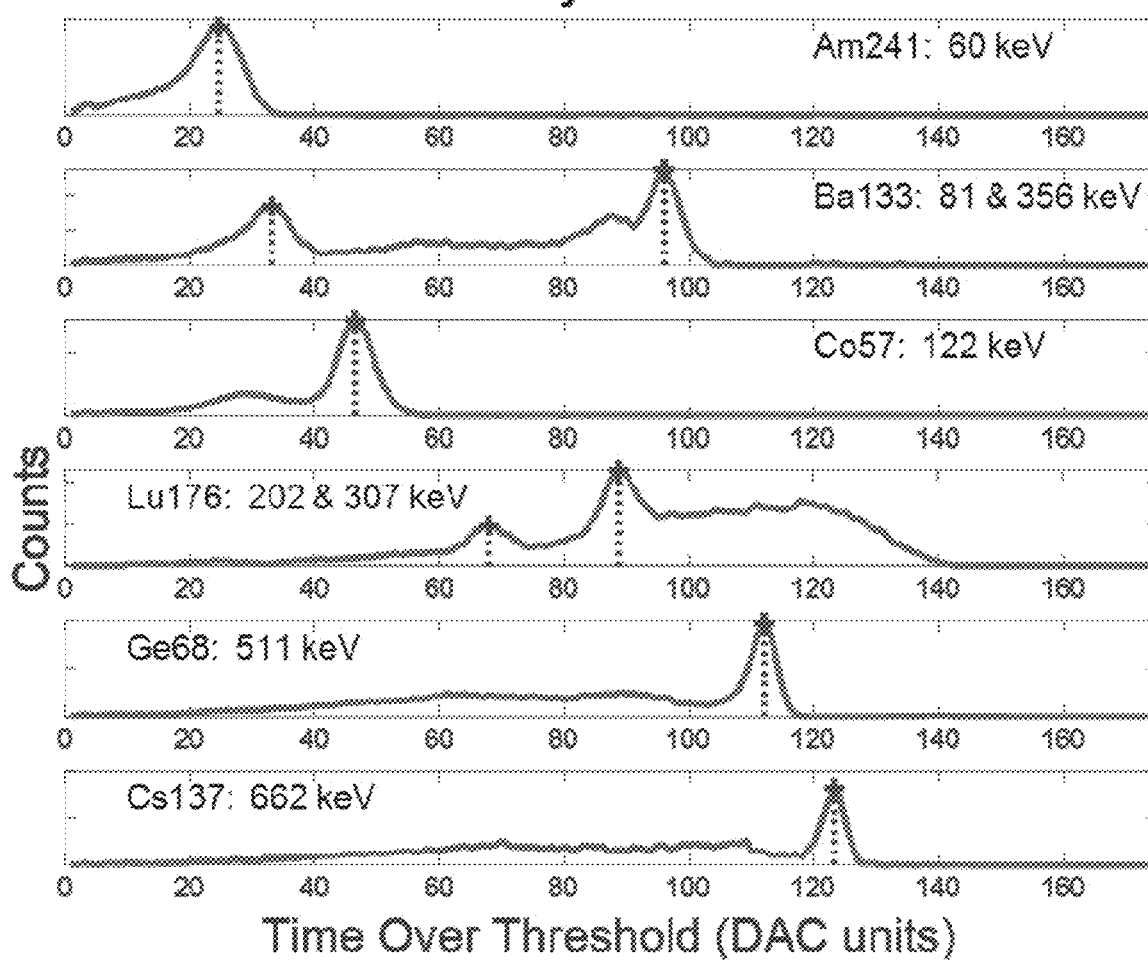
FIG. 7A shows plots of energy calibration spectra acquired for crystal A.
Figure 7B:
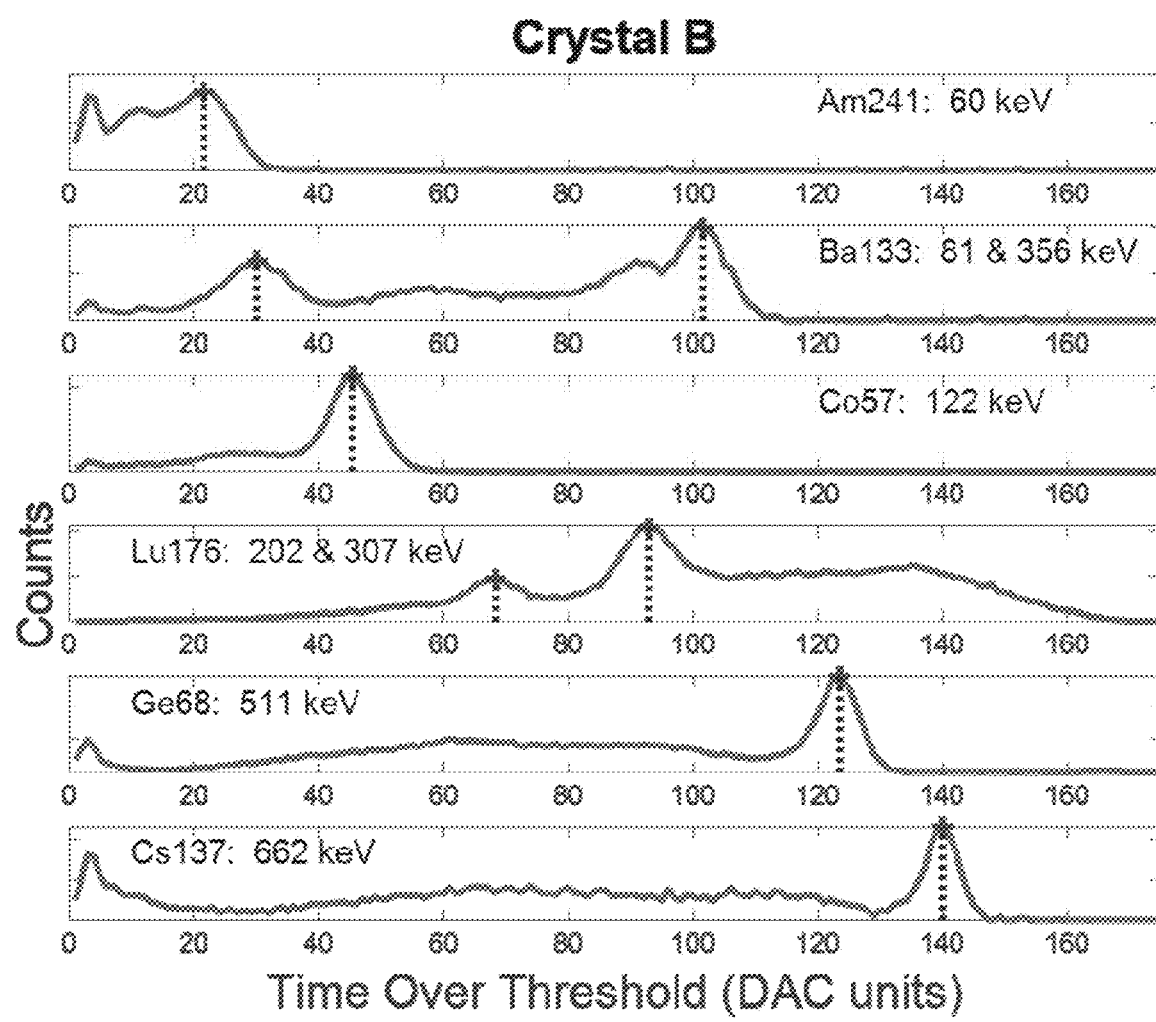
FIG. 7B shows plots of energy calibration spectra acquired for crystal B.
Figure 7C:
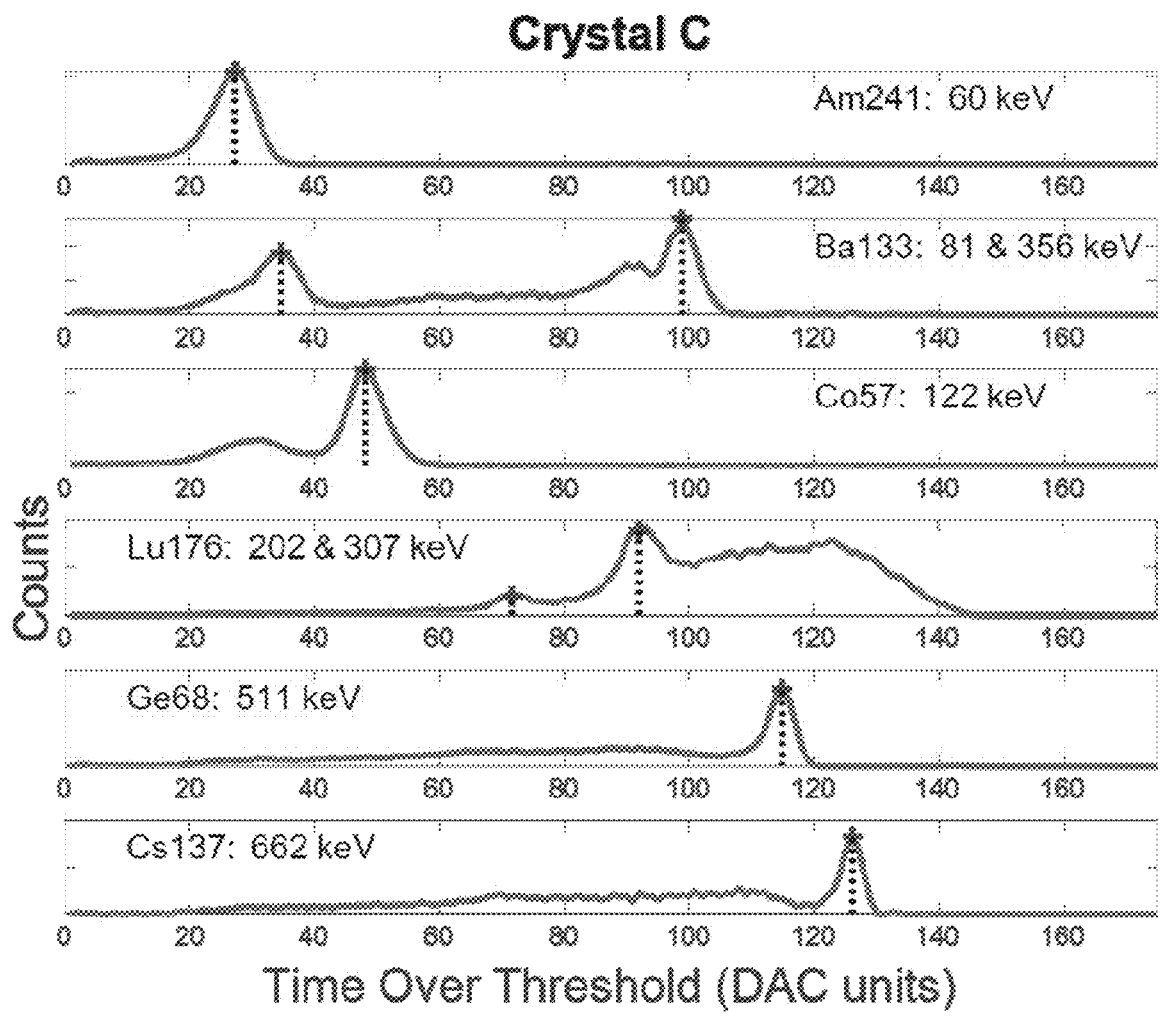
FIG. 7C shows plots of energy calibration spectra acquired for crystal C.

This method can leverage previous processes used in many-source energy calibrations. For example, in a many-source energy calibration the energy spectra for many isotopes can be measured to determine the energy signal/coordinate values for the peaks in each of the isotopes' spectra. This is illustrated in FIGS. 7A-7C, which respectively show the energy spectra acquired using six different for three different detector elements: (i) crystal A, crystal B, and crystal C. In these plots, the TOT signal (i.e., energy coordinates) is shown along the horizontal axis, and the counts are represented along the vertical axis. The isotopes used (and their energies) were Am-241 (59.5 keV), Ba-133 (81 and 356 keV), Co-57 (122 keV), Lu-176 (202 and 307 keV), Ge-68 (511 keV), and Cs-137 (662 keV). These isotopes where chosen to cover the range of interest of the 511 keV gamma rays and their Compton-scatter interactions. In a many-source approach to energy calibration, the parameters $\vec{p}$ of the energy-calibration model f are generated by curve fitting the TOT values corresponding to the 8 energy peaks with respective to the known energies (i.e., 59.5, 81, 122, 202, 307, 356, 511, and 662 keV) for the isotopes (i.e., Am-241, Ba-133, Co-57, Lu-176, Ge-68, and Cs-137).

In one implementation of the DL network approach to energy calibration, the DL network 135 is trained using the Lu-176 spectrum for the input data 143 and the target data are peak values for many different isotopes. Thus, the DL network 135 is trained to generate from a single spectrum the information that is normally obtained only by measuring many spectra. After the DL network 135 has been trained, it is used by applying a newly acquired Lu-176 spectrum as an input to generate the TOT values corresponding to the 8 peaks, and then using these TOT values to curve fit the energy-calibration model f, thereby generating the parameters $\vec{p}$.

Figure 8:
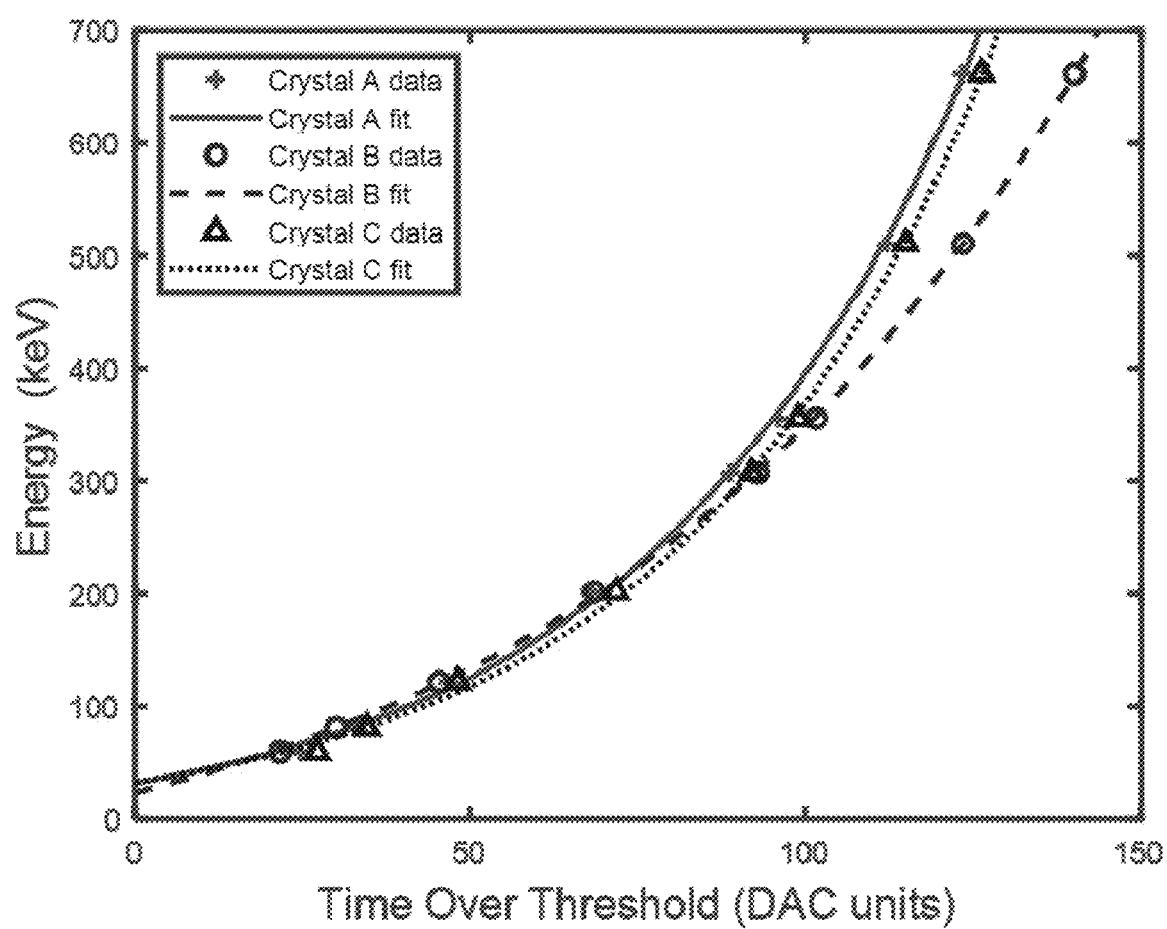
FIG. 8 shows a plot of the energy-calibration model being curve fit to the energy calibration data for crystals A-C, according to one implementation.

To illustrate this method, calibration data was acquired for 34,000 crystals. The data was divided into training, validation, and test sets. Training was terminated when the validation results stopped improving. The DL network 135 was trained to produce estimated positions for the 8 peaks listed above. These 8 peak positions were then fit to a 3-parameter function. FIG. 8 shows the fits for crystals A, B, and C from FIGS. 7A-7C. This three-parameter fit can be executed quickly in a computationally efficient manner to generate energy correction tables. In certain implementations, the curve fitting to determine the parameters $\vec{p}$ for a given detector in the detector array can be performed independently of the other detectors. Accordingly, the energy calibrations for respective detectors can be parallelized (i.e., performed using parallel computing) to achieve fast calibration on a multi-processor or multicore machine (e.g., a graphics processing unit or a multi-core central processing unit).

The training dataset of 35,000 crystals should be adequate so long as the distribution of crystal characteristics within the training dataset are similar to those crystals for which the DL network 135 will be used to calibrate. However, crystal and photosensor manufacturing processes might change in the future, and, therefore, a larger augmented training dataset might be desirable so that the DL network 135 can be trained using a greater range of nonlinear responses than is present within a current set of empirically measured scintillator crystals and detectors. FIG. 9 shows a flow diagram of a method 900 for generating an augmented/expanded training dataset. In method 900, the measured dataset is augmented/expanded to represent a wider range of nonlinearity variation than exhibited in the original measured values in the training dataset. Thus, the augmented training dataset includes calculated Lu-176 spectra and peak positions exhibiting a greater range of nonlinear responses than those that can be obtained through measurements of existing crystals/detectors. Training the DL network 135 using this expanded dataset will make the DL network 135 more robust to the potential range of future detectors, which might differ from and fall outside the range (e.g., statistical profile) of the nonlinearities exhibited by existing crystals/detectors.

The particular implementation discussed herein and illustrated in FIG. 9 is non-limiting, and variations can be used without departing from the spirit of the method for data augmentation to promote robustness. An ever-present challenge in developing PET calibration methods is that the currently available observations might not cover the entire range of behavior that will be seen in future systems. As discussed above, empirical training data was measured from about 35,000 crystals, but it is desirable for the calibration method to be robust to future changes in nonlinearity coefficients that might result from manufacturing variations in the detector components. Therefore, the data was augmented to provide calculated training data with a wider range of nonlinearity parameters.

Figure 10A:
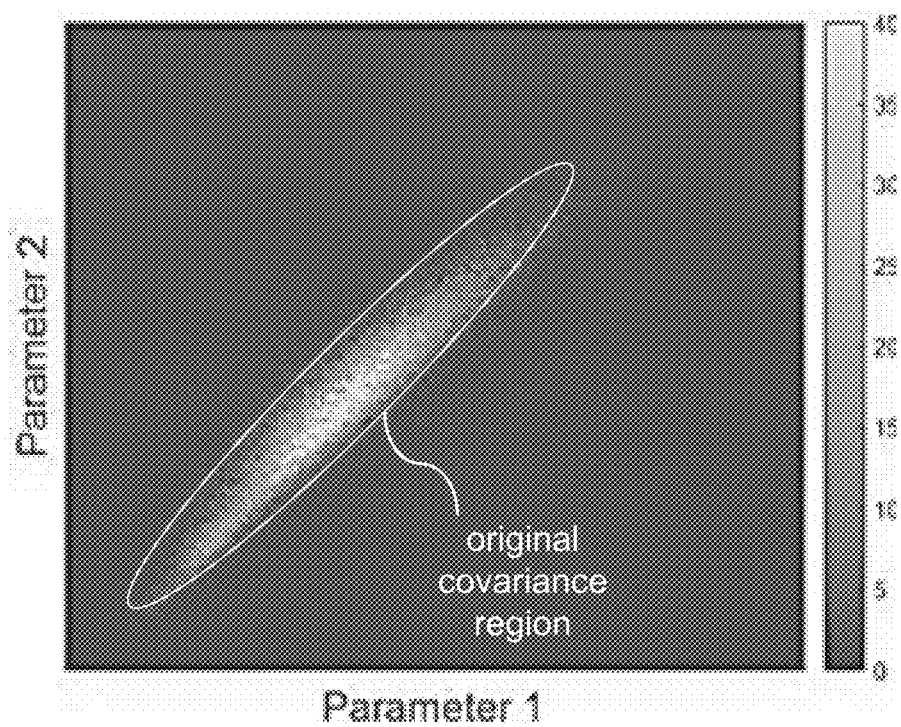
FIG. 10A shows a plot of a distribution of nonlinearity parameter 1 with respect to parameter 2 for a measured dataset.
Figure 10B:
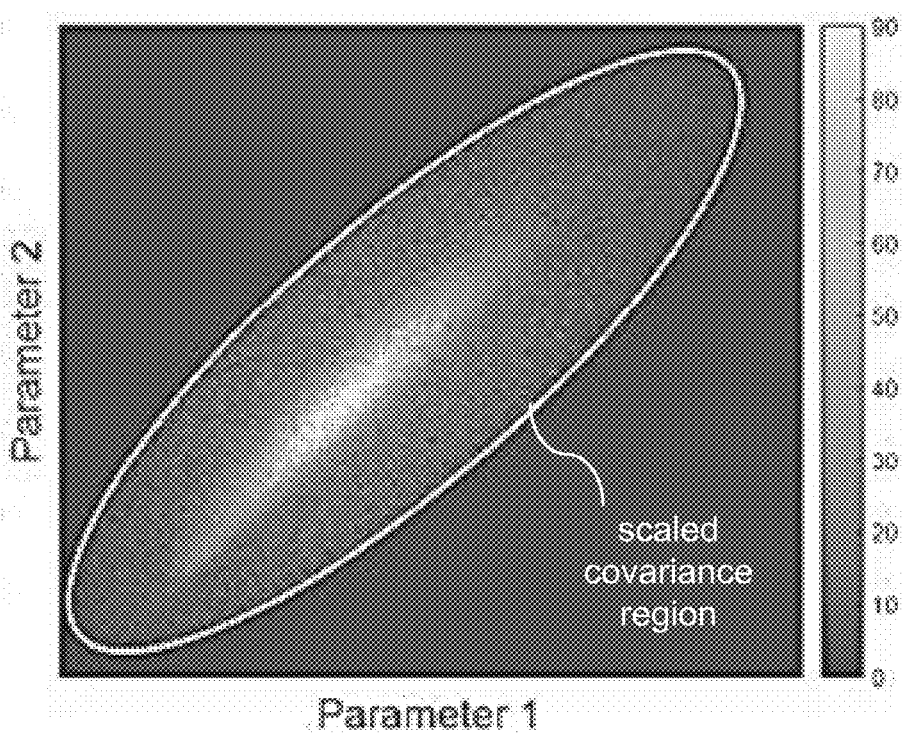
FIG. 10B shows a plot of a distribution of nonlinearity parameter 1 with respect to parameter 2 for an augmented dataset, the augmented dataset showing more variation than the measured dataset.

One non-limiting implementation of the data augmentation process worked as follows. In this non-limiting case, the data is augmented by generating five new data sets for each original data set (where each original data set corresponds to one crystal), thereby producing an expended dataset with six times the original number of samples. For all crystals, determine the 3 nonlinearity parameters by fitting the measured peak positions. Covariance matrices are calculated between respective pairs of the three parameters. FIG. 10A shows a scatter plot between parameters 1 and 2, which can be described by the covariance matrix. Next, the covariance matrix is scaled/expanded to increase the apparent variability of the parameters. For each crystal, the original 3 nonlinearity parameters are used to transform the Lu-176 ToT spectrum to an energy spectrum. Then, using the scaled covariance matrix, five sets of 3 new nonlinearity parameters are randomly chosen, covering a wider range than the measured data (i.e., spanning the scaled covariance matrix, which is referred to as the scaled covariance region). For example, this can be performed by randomly choosing sets of parameters, and throwing out those sets of parameters for which any parameters fall outside a predetermined region of phase space (referred to as the scaled covariance region in FIG. 10B). Then, keep randomly choosing sets of parameters until they all fall within a predetermined region of phase space, as shown in FIG. 10B. Generate new data sets by applying each set of new nonlinearity parameters to the Lu-176 energy spectrum to transform it to a new ToT spectrum (new input data for the training dataset), and apply the same transformation to the 8 peak positions to produce new target data for the training dataset. The distribution of measured nonlinearity parameters is shown in FIG. 10A, and the distribution of augmented nonlinearity parameters is shown in FIG. 10B.

Returning to FIG. 9, in step 910 of method 900, a measured dataset is obtained.

In step 920 of method 900, the measured nonlinearity parameters $\vec{p}_{meas}$ are determined. For example, measurements using other isotopes (i.e., Am-241, Ba-133, Co-57, Lu-176, Ge-68, and Cs-137) can be used to generate measured nonlinearity parameters $\vec{p}_{meas}$.

In step 930, new parameters (i.e., the augmented nonlinearity parameters) are calculated to have distribution (e.g., a statistical profile represented by the covariance matrix) that extends beyond the distribution profile of the measured nonlinearity parameters $\vec{p}_{meas}$.

In step 940 of method 900, the measured nonlinearity parameters $\vec{p}_{meas}$ and measured Lu-176 spectra $x_{meas}^{(Lu-176)}$ are used to perform a forward mapping $E^{(Lu-176)} = f(x_{meas}^{(Lu-176)}, \vec{p}_{meas})$ to determine calibrated Lu-176 spectra $E^{(Lu-176)}$. The same process can be applied to the ToT values $x^{(ref.)}$ for the reference peaks, to generate calibrated energies $E^{(ref.)}$.

In step 950, backward mappings $x_{calc.}^{(Lu-176)} = f^{-1}(E^{(Lu-176)}, \vec{p}_{calc.})$ and $x_{calc.}^{(ref.)} = f^{-1}(E^{(ref.)}, \vec{p}_{calc.})$ are performed using the of augmented nonlinearity parameters $\vec{p}_{calc.}$ to generate an augmented dataset of input data $\{x_{meas.}^{(Lu-176)}, x_{calc.}^{(Lu-176)}\}$ and target data $\{x_{meas}^{(ref.)}, x_{calc.}^{(ref.)}\}$ for training the DL network 135 to make it more robust to the possibility of a wide range of detector nonlinearities in the further.

In step 960, the DL network 135 is further trained/updated by training using the augmented dataset. Then the updated DL network 135 can be used in step 155 of method 100 as discussed above.

In the implementation discussed above, the DL network 135 receives an Lu-176 spectrum as an input, and outputs TOT values corresponding to respective reference peaks. In the above implementation, these TOT values of the reference peaks were used to curve fit an energy-calibration model f to thereby generate parameters $\vec{p}$. In an alternative implementation, the reference peaks can be directly used as the parameters $\vec{p}$, and curves similar to those shown in FIG. 8 can be obtained by using the TOT values and known energies of the reference peaks to interpolate/extrapolate calibrated energy values corresponding to respective TOT values. Any method of interpolation can be used including, e.g., linear, quadratic, cubic, and spline interpolation methods. Further, in certain implementations, the reference values can correspond to energies other than peaks.

In certain implementations, the energy calibration is stored as a look-up-table (LUT). For example, even when the energy-calibration model has a particular functional form, the energy values corresponding to respective measured energy signals (e.g., the TOT values) can be precomputed and stored in a LUT for fast reference, and for measured energy signals that fall between those recorded in the LUT interpolation can be used to determine the corresponding calibrated energy values.

Figure 11:
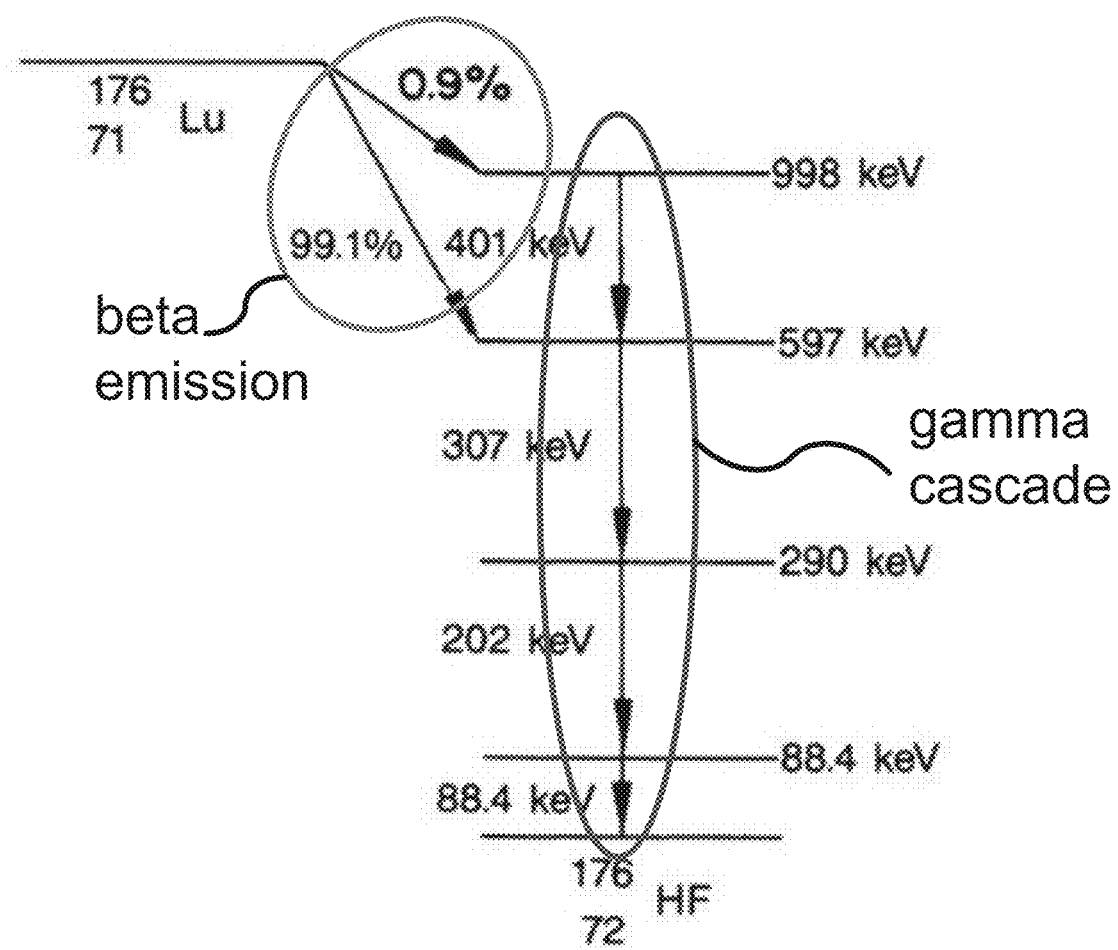
FIG. 11 shows a diagram of an energy level diagram of Lu-176 for a physics-based model of the Lu-176 spectrum, according to one implementation.
Figure 12:
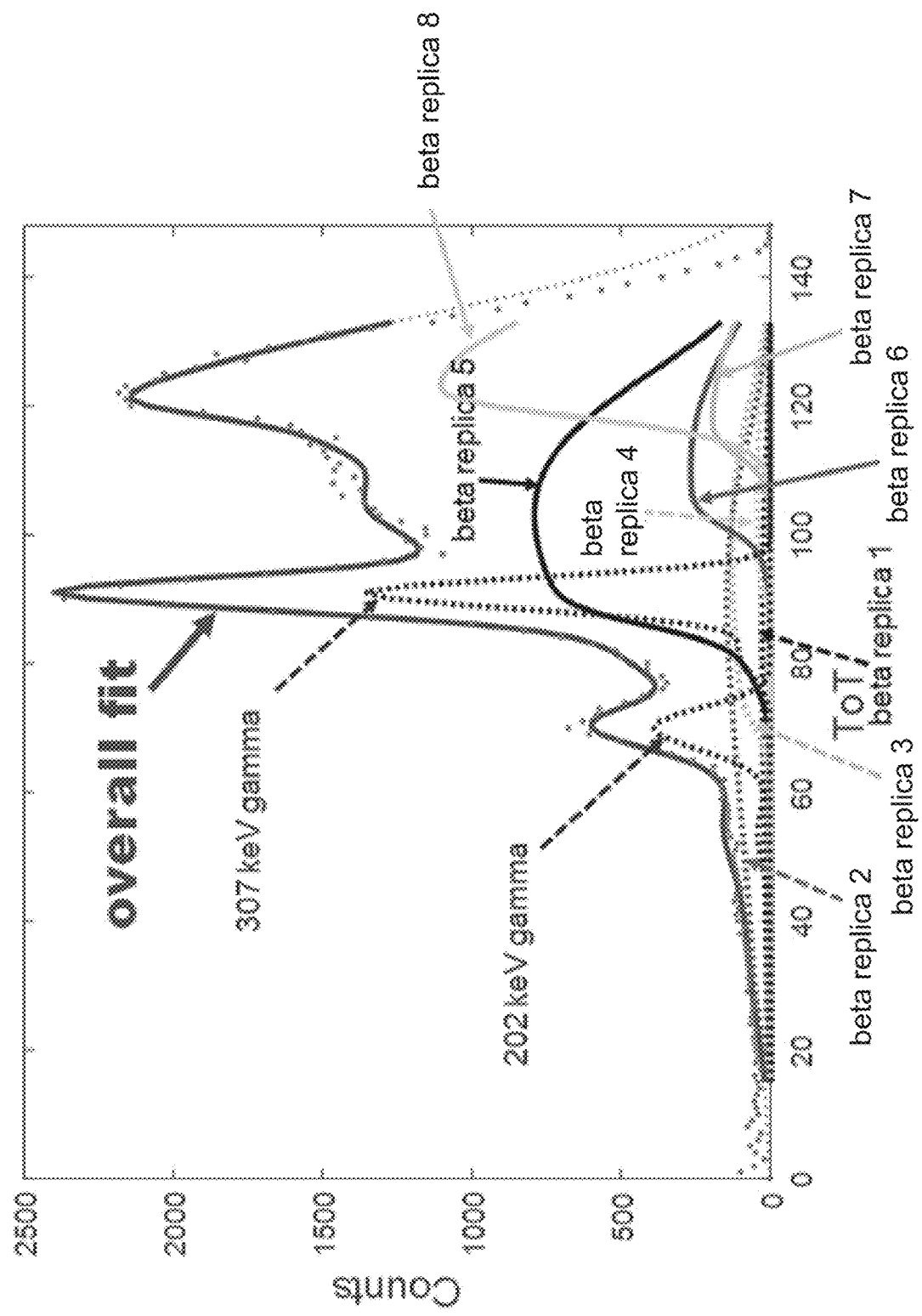
FIG. 12 shows a plot of spectra for respective decay pathways/radiation processes that contribute to the Lu-176 spectrum, according to one implementation.

Further, in certain implementations, the DL network 135 can be replaced by a physics-based model 135 that is a complex physics-based model of the spectrum. In this alternative approach, rather than using an artificial neural network, the input spectrum is fit to a complex physics-based model of the spectrum. The model includes adjustable parameters to describe the nonlinearity. The best-fit to the data provides, among other parameters, the nonlinearity coefficients. FIG. 11 shows a level diagram for the energy levels and radiation pathways in Lu-176. As shown in FIG. 11, Lu-176 decays by beta emission followed by a cascade of gamma rays. The beta emission and gamma cascade essentially occur simultaneously. That is, they occur much closer in time than the resolution of the detector system. FIG. 12 shows that based on the physical model the Lu-176 spectrum can be modeled as a superposition of spectra from several contributing radiative decay processes.

In view of FIG. 11, the physics-based model can be better understood by considering several simplifying assumptions. First, in the beta emission, it can be assumed that all decays occur through the 99.1% path.

Second, the beta energy is essentially always fully captured in the scintillator. Thus, it can be assumed that 100% of beta particles deposit all of their energy in the crystal in which they originate.

Third, the gamma rays (88, 202 and 307 keV) may either be captured or they may escape. The probability depends on the energy and the scintillator size. Consequently, the beta spectrum gets replicated several times, and the overall spectrum is the sum of these replicated spectra. For example, the decays for which the 88 keV and 307 keV gamma rays are captured produce a beta spectrum which is shifted by (88+307=395 keV). Accordingly, it can be assumed that the probability of escape for each of the three gamma rays can be represented by three probabilities (P88, P202, P307), wherein P88 is the probability that the 88 keV gamma ray escapes, P202 is the probability that the 202 keV gamma ray escapes, P307 is the probability that the 307 keV gamma ray escapes, and P88<P202<P307. This is a simplification because, in reality, the probability of escape depends on the location at which the radiative decay occurs within the scintillator, whereas here it is assumed that, for each energy, the probability of escape is a constant, rather than a function of position and geometry of the crystal.

TABLE 1 probabilities of the 8 beta replica scenarios.

| num | 88 keV captured | 202 keV captured | 307 keV captured | 1st order replica relative amplitude |
| --- | --- | --- | --- | --- |
| 1 | — | — | — | P88 * P202 * P307 |
| 2 | X | — | — | (1 − P88) * P202 * P307 |
| 3 | — | X | — | P88 * (1 − P202) * P307 |
| 4 | — | — | X | P88 * P202 * (1 − P307) |
| 5 | X | X | — | (1 − P88) * (1 − P202) * P307 |
| 6 | X | — | X | (1 − P88) * P202 * (1 − P307) |
| 7 | — | X | X | P88 * (1 − P202) * (1 − P307) |
| 8 | X | X | X | (1 − P88) * (1 − P202) * (1 − P307) |

Fourth, for three gamma rays, each of which can escape or be captured, there are $2^3=8$ possible beta spectrum replicas. For each of the 8 possible permutations according to which the three gamma rays do or do not escape, the probability is given in Table 1. The beta replica number on the left-hand-side corresponds to the beta replica number shown in FIG. 12. For example, if both the 88 keV and 202 keV gamma rays are captured, then the spectrum will be shifted (i.e., 88+202=290 keV), providing the spectrum for beta replica 5 as shown in FIG. 12. Further the probability (weight) given to this scenario is given by (1−P88)*(1−P202)*P307.

Fifth, in the presence of other scintillator elements (such as other scintillator pixels in the same detector block or other detectors in a PET detector ring), the escapes from one detector (mainly 202 and 307 keV) can be detected in other detectors, resulting in additional peaks. To simplify the physical model it can be assumed that only the 202 and 307 keV escapes from other detector elements result in significant contributions to the overall spectrum.

Sixth, the features of the spectrum will be modified by the energy resolution of the overall detection system (combination of scintillator, photosensor, and electronics). To simplify the physical model it can be assumed that the energy resolution can be described by a single parameter. For example, the resolution at 511 keV ($E_{res}^{(511\,keV)}$) can be used as the one parameter, and it can be assumed that the energy resolution at a given energy, E, is given by $$E_{res}(E) = E_{res}^{(511 keV)} \times \sqrt{\frac{E}{511 \text{ keV}}}.$$

Above, the energy resolution is assumed to scale with the square-root of the energy.

Each of the beta replicas can be represented by a parameterized shape function B, which is expressed as $B(E_{00}, E_{res}^{(511\,keV)})$ wherein $E_{00}$ is the energy shift of the replica due to) the simultaneously absorbed gamma rays. The amplitude is determined by an amplitude scale factor, A, and the relative amplitude factor, which is provided in the right-most column in Table 1. As an example, for the replica representing line 6 in Table 1 (i.e., the gamma rays of energy 88 and 307 keV are captured), the energy shift is $E_{00}=88+307=395$ keV, and the overall replica for beta replica $6\beta_6$ would be $$\beta_6 = A \times (1-P88) \times P202 \times (1-P307) \times B(395, E_{res}^{(511\,keV)}).$$

The overall energy spectrum is the sum of 8 beta-replicas and two gamma peaks (202 and 307 keV) resulting from absorption of escapes from other detector elements, as shown in FIG. 12. Additional equations can be applied to model the effects of links along the detection pathway (e.g., scintillators, photosensors, and read-out electronics). For example, the quantum efficiency of the photosensors might vary as a function of energy.

Next, the nonlinearity of the detector is represented by parameterized equations. For example, for a detector read-out using the Time-over-Threshold (ToT) method, four parameters—C, a, E0, and ToT511—can be used to describe the nonlinearity. The energy, E, is then represented by the equations:

$$d = E0/C - 1,$$

$$b = ToT511/\log(511/C - d); \text{ and}$$

$$E = C^*(\exp(ToT/(a/ToT + b)) + d),$$

wherein ToT is the measured signal.

Putting all of the above assumption together, the overall Lu-176 spectrum is described by a physical model with 11 free parameters:
1. A: overall scaling factor for beta-replicas
2. Eres_511: energy resolution at 511 keV
3. P88: 88 keV escape probability
4. P202: 202 keV escape probability
5. P307: 307 keV escape probability
6. A202: amplitude of 202 keV peak (escapes from other detectors)
7. A307: amplitude of 307 keV peak (escapes from other detectors)
8. C: nonlinearity parameter #1
9. a: nonlinearity parameter #2
10. E0: nonlinearity parameter #3
11. ToT511: nonlinearity parameter #4

Accordingly, adjusting these 11 parameters to optimally agree with the measured spectra generates the four parameters (C, a, E0, and ToT511) that define the nonlinear detector response. These 11 parameters can be determined by fitting methods known to those skilled in the art. For example, they can be determined using a simplex search using a least-squares penalty function.

Figure 13:
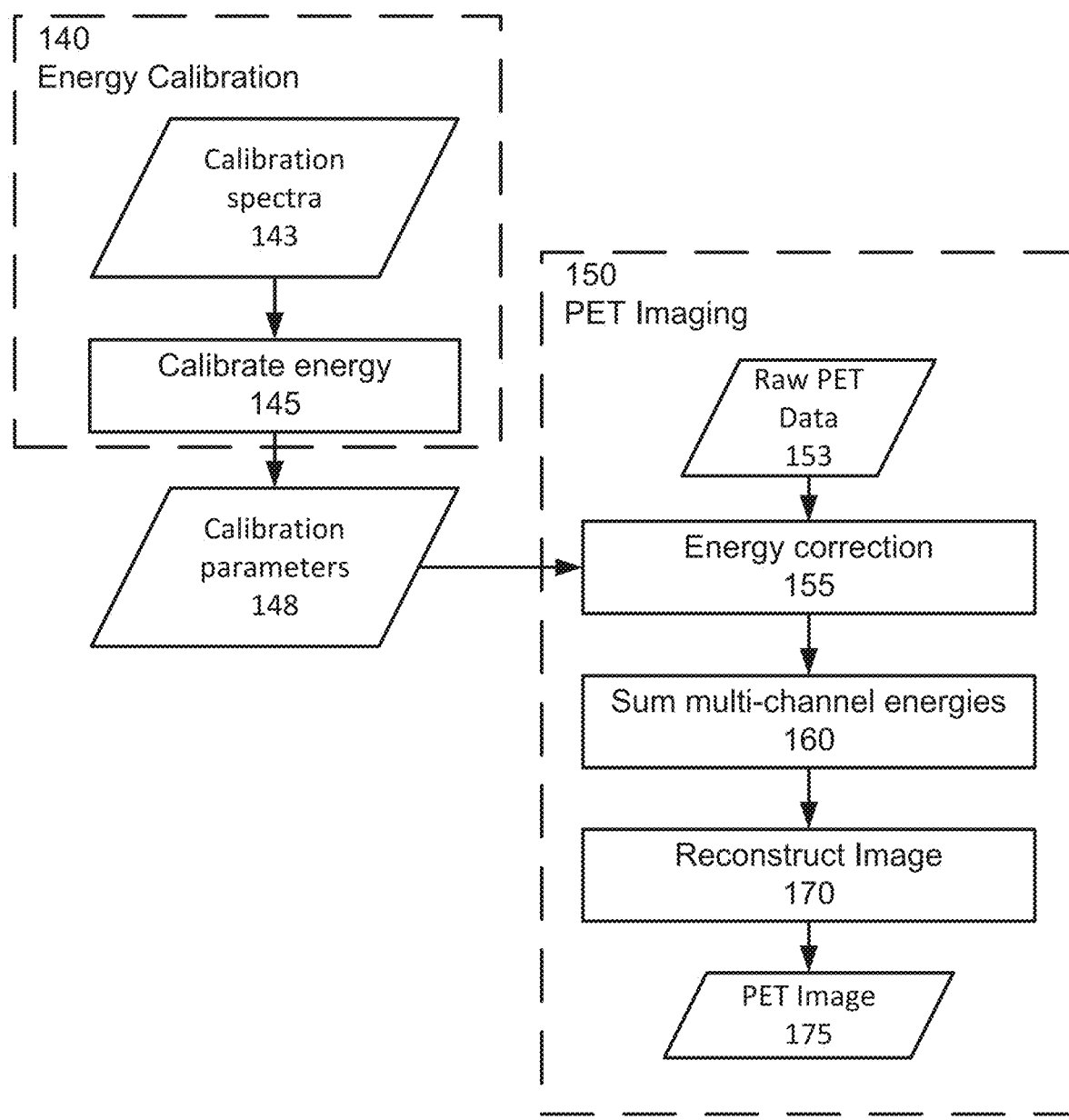
FIG. 13 shows a flow diagram for physics-based model implementation of method 100 for performing an energy calibration and reconstructing a PET image, according to one implementation.

FIG. 13 shows an implementation of method 100 using the physics-based model, rather than a DL network to perform the energy correction in step 145 of the energy calibration process 140. In step 155, the energy calibration parameters 148 from process 140 is applied to the raw data 153 as discussed in the flow of FIG. 5. Further, steps 160 and 170 are the same as in FIG. 5. The difference is that process 110 for offline training is not necessary for the physics-based model. In certain implementations, regularization and/or constraints can be placed on the free parameters in the physics-based model to avoid overfitting and/or unphysical values for the parameters (e.g., there are a range of reasonable values for the probabilities P88, P202, and P307, and values outside this range will be unphysical).

Figure 14A:
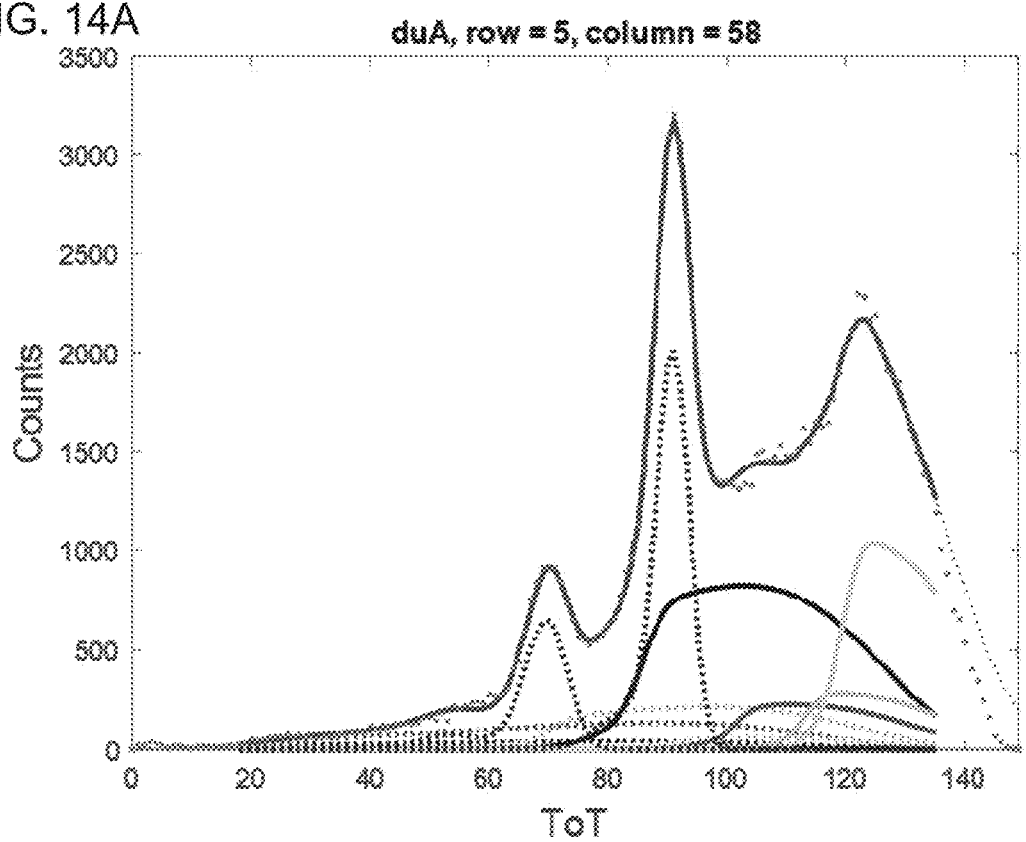
FIG. 14A shows a plot of a measured Lu-176 spectrum of a first crystal being curve fit using the physics-based model.
Figure 14B:
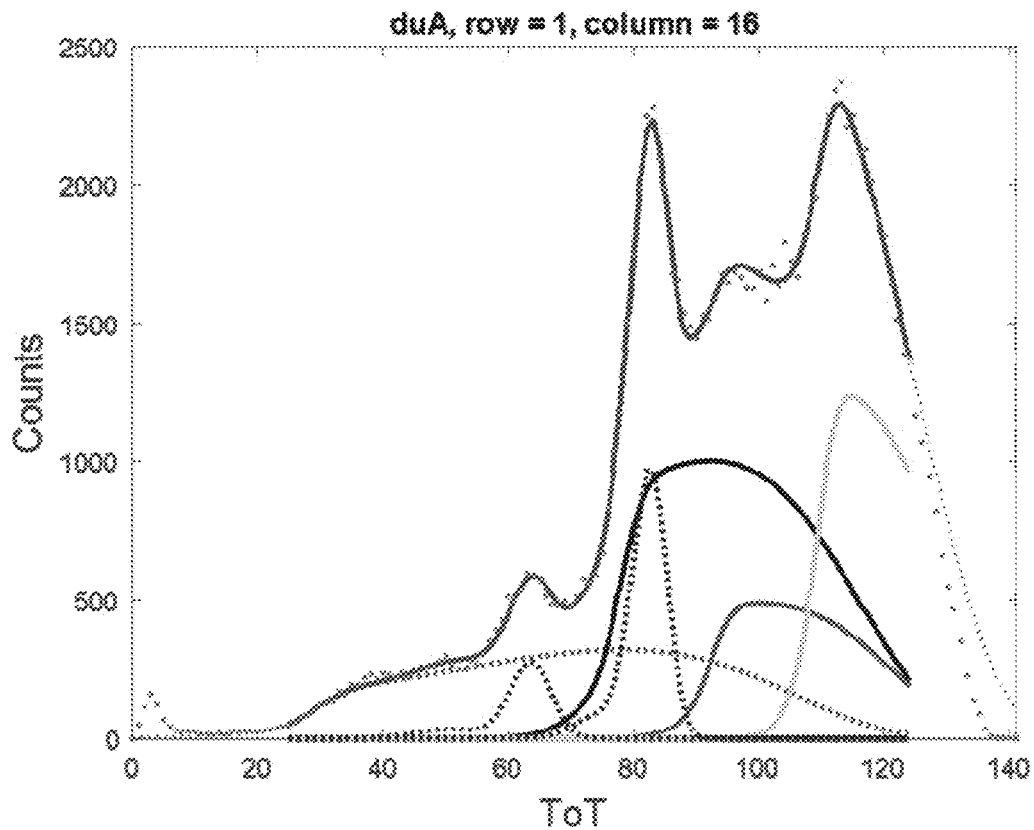
FIG. 14B shows a plot of a measured Lu-176 spectrum of a second crystal being curve fit using the physics-based model.

FIGS. 14A and 14B, show two examples of measured Lu-176 spectra and the curve fits obtained using the physics-based model, with the component beta replicas and gamma-ray spectra also illustrated.

In addition to the implementations described above, the energy calibration data 143 can be expanded to include a spectrum from another radiation source in addition to the Lu-176 spectrum. The Lu-176 spectrum is convenient because it is present in lutetium-based scintillator crystals, and thus can be generated using background radiation in the PET scanner without introduction a radiation source specifically for calibration. However, using another radiation source specifically for energy calibration can be used to improve the accuracy of the calibration. Thus, calibration could be performed with spectra including at least three known energy peaks (i.e., two from the Lu-176 spectrum and at least one more peak from the additional spectrum of another isotope). In this implementation the other isotopes can be, e.g., germanium isotope 68 (Ge-68). Alternatively, the other isotopes can be barium isotope 133 (Ba-133) or cesium isotope 137 (Cs-173).

Additionally, the methods described herein could be performed without using the Lu-176 spectrum. Other spectra could be used that have more detailed features than just a single full-energy peak. Cs-137 would be a logical choice to replace Lu-176 in method 100 because Cs-137 produces energies over the entire range of interest. The above description includes the illustrative example of using a combination of Lu-176 and Ge-68 spectra for the energy calibration data. This particular combination is used out of convenience because these two spectra are generally readily available, but other radiation spectra can be used. That is, the same technique described above using a combination of Lu-176 and Ge-68 spectra could be applied to two other spectra (e.g., Ba-133 and Cs-173). In general, method 100 can be performed with using a combination of Ba-133 and Cs-173 as the spectra for the energy calibration data 143.

The methods described herein have several advantages over related methods of energy calibration.

First, the calibration can be performed using a single background spectrum, or at most very few spectra (e.g., one additional spectrum from an additional isotope).

Second, although a substantial amount of time might be required to train the DL network, this training can be performed once offline. Thereafter, the energy calibration in step 145 can be performed extremely fast using the DL network. For example, a PET scanner can include 10s of thousands of crystals, and the DL network 135 can perform the entire energy calibration for all of the 10s of thousands of crystals in the PET scanner in a few milliseconds. Using two calibration spectra (e.g., Lu-176 and Ge-68) rather than just one can sacrifice speed for improved accuracy of the energy calibration. Even with the sacrifice in speed the energy calibration will still be performed relatively fast.

Figure 15A:
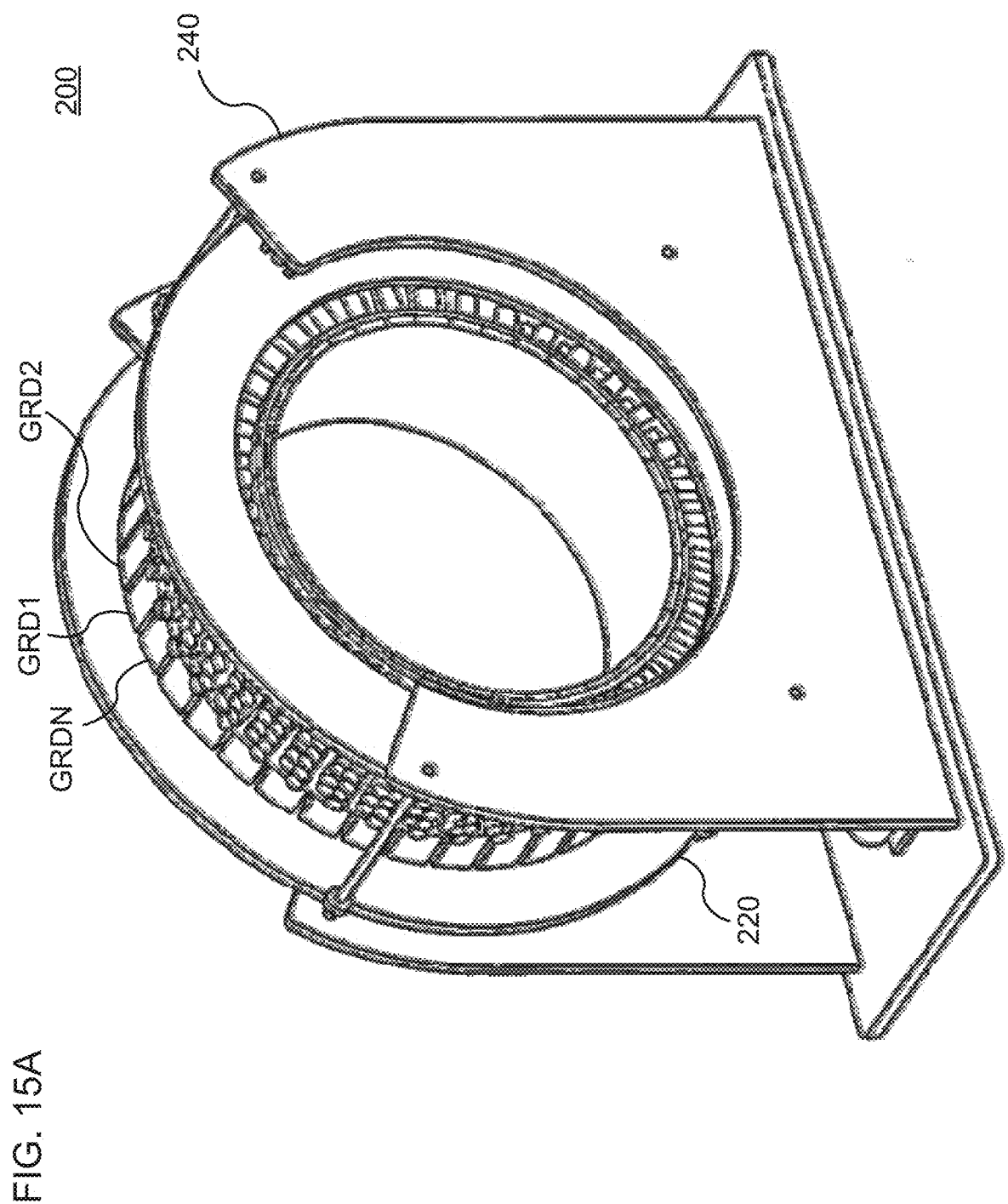
FIG. 15A shows a perspective view of a PET scanner, according to one implementation.
Figure 15B:
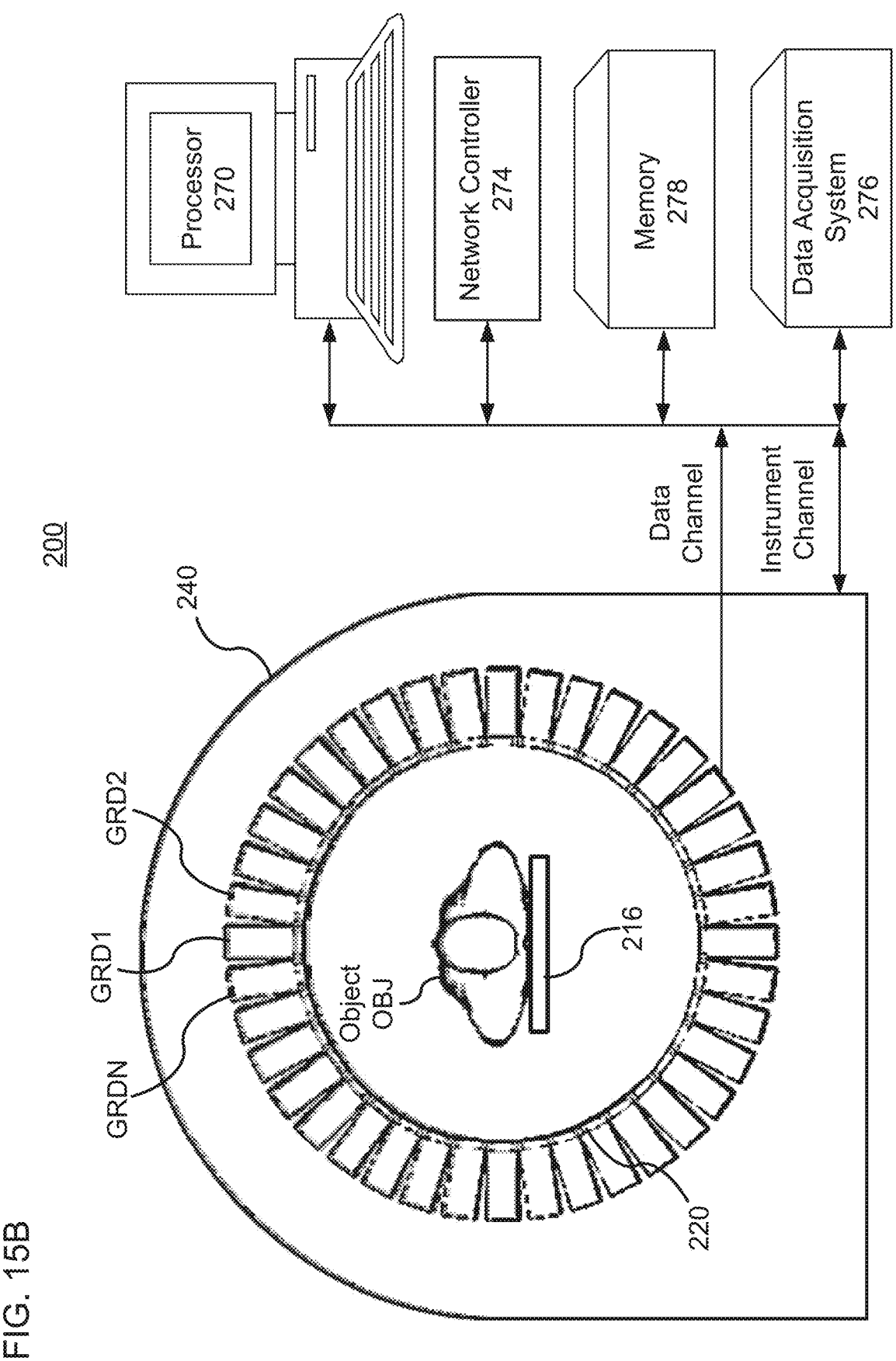
FIG. 15B shows a schematic view of the PET scanner, according to one implementation.

FIGS. 15A and 15B show a non-limiting example of a PET system 200 that is configured with detector modules (i.e., gamma-ray detectors (GRD)) arranged in an annular shape. Each of the detector modules can include several arrays of detector elements. The GRDs include scintillator crystal arrays for converting the gamma rays into scintillation photons (e.g., at optical, infrared, and ultraviolet wavelengths), which are detected by photodetectors. In the non-limiting example illustrated in FIGS. 15A and 15B, the photodetectors are photomultiplier tubes (PMTs) that are much bigger than the respective scintillator crystal elements. In one preferred embodiment, the photodetectors are silicon photomultipliers (SiPMs) that can have a detection cross-section that approximates the cross-sectional area of the individual scintillator crystal elements, creating a one-to-one correspondence between the crystals and the photodetectors. If the photodetectors are larger than the crystals, such that a single photodetector is used to detect the optical signals from multiple crystals, then Anger arithmetic can be used to determine the positions. However, Anger arithmetic is not necessarily required when there is a one-to-one correspondence between the crystals and the photodetectors.

FIGS. 15A and 15B show a non-limiting example of a PET scanner 200 that can implement the methods 100 and 160. The PET scanner 200 includes a number of gamma-ray detectors (GRDs) (e.g., GRD1, GRD2, through GRDN) that are each configured as rectangular detector modules.

According to one implementation, the detector ring includes 40 GRDs. In another implementation, there are 48 GRDs, and the higher number of GRDs is used to create a larger bore size for the PET scanner 200.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs.

Alternatively, the scintillation photons can be detected by an array a silicon photomultipliers (SiPMs), and each individual detector crystals can have a respective SiPM.

Each photodetector (e.g., PMT or SiPM) can produce an analog signal that indicates when scintillation events occur, and an energy of the gamma ray producing the detection event. Moreover, the photons emitted from one detector crystal can be detected by more than one photodetector, and, based on the analog signal produced at each photodetector, the detector crystal corresponding to the detection event can be determined using Anger logic and crystal decoding, for example.

FIG. 15B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 15A and 15B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 15B shows an example of the arrangement of the PET scanner 200, in which the object OBJ to be imaged rests on a table 216 and the GRD modules GRD1 through GRDN are arranged circumferentially around the object OBJ and the table 216. The GRDs can be fixedly connected to a circular component 220 that is fixedly connected to the gantry 240. The gantry 240 houses many parts of the PET imager. The gantry 240 of the PET imager also includes an open aperture through which the object OBJ and the table 216 can pass, and gamma-rays emitted in opposite directions from the object OBJ due to an annihilation event can be detected by the GRDs and timing and energy information can be used to determine coincidences for gamma-ray pairs.

In FIG. 15B, circuitry and hardware is also shown for acquiring, storing, processing, and distributing gamma-ray detection data. The circuitry and hardware include: a processor 270, a network controller 274, a memory 278, and a data acquisition system (DAS) 276. The PET imager also includes a data channel that routes detection measurement results from the GRDs to the DAS 276, a processor 270, a memory 278, and a network controller 274. The data acquisition system 276 can control the acquisition, digitization, and routing of the detection data from the detectors. In one implementation, the DAS 276 controls the movement of the bed 216. The processor 270 performs functions including reconstructing images from the detection data, pre-reconstruction processing of the detection data, and post-reconstruction processing of the image data, as discussed herein.

The processor 270 can be configured to perform various steps of methods 100 and 160 described herein and variations thereof. The processor 270 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 270 can execute a computer program including a set of computer-readable instructions that perform various steps of methods 100 and 160, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

The memory 278 can be a hard disk drive, CD-ROM drive, DVD drive, FLASH drive, RAM, ROM or any other electronic storage known in the art.

The network controller 274, such as an Intel Ethernet PRO network interface card from Intel Corporation of America, can interface between the various parts of the PET imager. Additionally, the network controller 274 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

Now a more detailed description of training a DL network is provided (e.g., process 130). Here, the target data 120 are parameters of an energy-calibration model. In an alternative implementation, the target data 120 are reference energy coordinates (e.g., measured values for spectral peaks corresponding to multiple isotopes—Am-241, Ba-133, Co-57, Lu-176, Ge-68, and Cs-137), and the input data 115 are calibration spectra as a function of the energy coordinates (e.g., the TOT values) generated using one isotope (e.g., Lu-176) or using two isotopes (e.g., Lu-176 and Ge-68). For simplicity, the process 130 is illustrated using the example of the target data 120 being model parameters.

Figure 16:
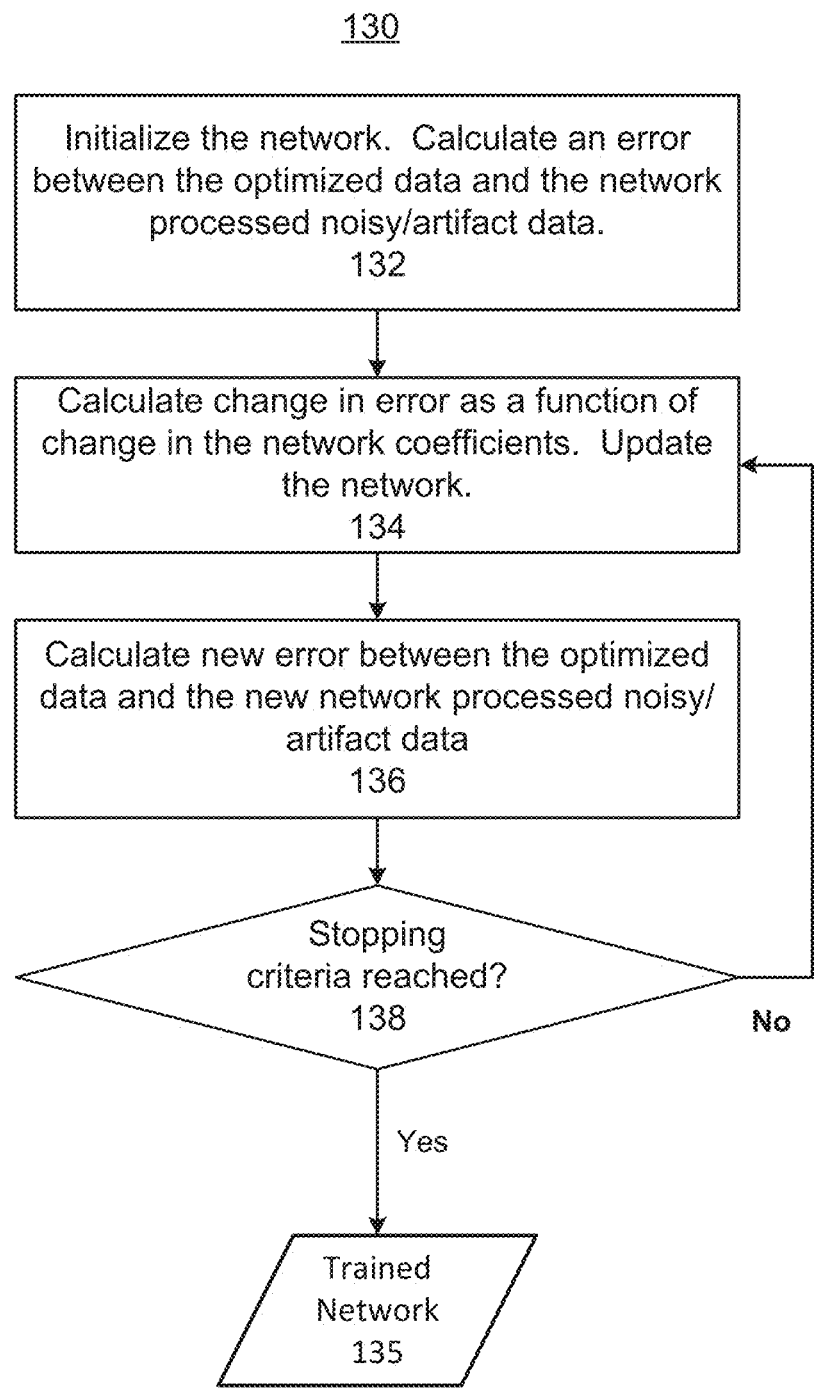
FIG. 16 shows a flow diagram a process 130 for training a DL network, according to one implementation.

FIG. 16 shows a flow diagram of one implementation of the training process 130. In process 130, input data 115 and target data 120 are used as training data to train a DL network 135, resulting in the trained DL network 135 being output from step 138 of process 130. The offline DL training process 130 trains the DL network 135 using a large number of input spectra 115 that are paired with corresponding reference signal of the target data 120 to train the DL network 135 to produce model parameters resembling the target model parameters 120.

In process 130, a set of training data is obtained, and the network 135 is iteratively updated to reduce the error (e.g., the value produced by a loss function). The DL network infers the mapping implied by the training data, and the cost function produces an error value related to the mismatch between the target model parameters 120 and the result produced by applying a current incarnation of the DL network 135 to the input spectra 115. For example, in certain implementations, the cost function can use the mean-squared error to minimize the average squared error. In the case of a of multilayer perceptrons (MLP) neural network, the backpropagation algorithm can be used for training the network by minimizing the mean-squared-error-based cost function using a (stochastic) gradient descent method.

In step 132 of process 130, an initial guess is generated for the coefficients of the DL network 135. Additionally, the initial guess can be based on one of a LeCun initialization, an Xavier initialization, and a Kaiming initialization.

Steps 132 through 138 of process 130 provide a non-limiting example of an optimization method for training the DL network 135.

An error is calculated (e.g., using a loss function or a cost function) to represent a measure of the difference (e.g., a distance measure) between the target model parameters 120 and the output from the network generated by applying the input spectra 115 to a current version of the network 135. The error can be calculated using any known cost function or distance measure between the image data, including those cost functions described above. Further, in certain implementations the error/loss function can be calculated using one or more of a hinge loss and a cross-entropy loss. In certain implementations, the loss function can be the $l_p$-norm of the difference between the target data and the result of applying the input data to the DL network 135. Different values of "p" in the $l_p$-norm can be used to emphasize different aspects of the noise.

In certain implementations, the network 135 is trained using backpropagation. Backpropagation can be used for training neural networks and is used in conjunction with gradient descent optimization methods. During a forward pass, the algorithm computes the network's predictions based on the current parameters θ. These predictions are then input into the loss function, by which they are compared to the corresponding ground truth labels (i.e., the high-quality target data 120). During the backward pass, the model computes the gradient of the loss function with respect to the current parameters, after which the parameters are updated by taking a step of a predefined size in the direction of minimized loss (e.g., in accelerated methods, such that the Nesterov momentum method and various adaptive methods, the step size can be selected to more quickly converge to optimize the loss function).

The optimization method by which the backprojection is performed can use one or more of gradient descent, batch gradient descent, stochastic gradient descent, and mini-batch stochastic gradient descent. The forward and backwards passes can be performed incrementally through the respective layers of the network. In the forward pass, the execution starts by feeding the inputs through the first layer, thus creating the output activations for the subsequent layer. This process is repeated until the loss function at the last layer is reached. During the backward pass, the last layer computes the gradients with respect to its own learnable parameters (if any) and also with respect to its own input, which serves as the upstream derivatives for the previous layer. This process is repeated until the input layer is reached.

Returning to FIG. 16, step 134 of process 130 determines a change in the error as a function of the change in the network can be calculated (e.g., an error gradient), and this change in the error can be used to select a direction and step size for a subsequent change to the weights/coefficients of the DL network 135. Calculating the gradient of the error in this manner is consistent with certain implementations of a gradient descent optimization method. In certain other implementations, this step can be omitted and/or substituted with another step in accordance with another optimization algorithm (e.g., a non-gradient descent optimization algorithm like simulated annealing or a genetic algorithm), as would be understood by one of ordinary skill in the art.

In step 134 of process 130, a new set of coefficients are determined for the DL network 135. For example, the weights/coefficients can be updated using the changed calculated in step 134, as in a gradient descent optimization method or an over-relaxation acceleration method.

In step 136 of process 130, a new error value is calculated using the updated weights/coefficients of the DL network 135.

In step 138, predefined stopping criteria are used to determine whether the training of the network is complete. For example, the predefined stopping criteria can evaluate whether the new error and/or the total number of iterations performed exceed predefined values. For example, the stopping criteria can be satisfied if either the new error falls below a predefined threshold or if a maximum number of iterations is reached. When the stopping criteria is not satisfied the training process performed in process 130 will continue back to the start of the iterative loop by returning and repeating step 134 using the new weights and coefficients (the iterative loop includes steps 134, 136, and 138). When the stopping criteria are satisfied the training process performed in process 130 is completed.

Figure 17:
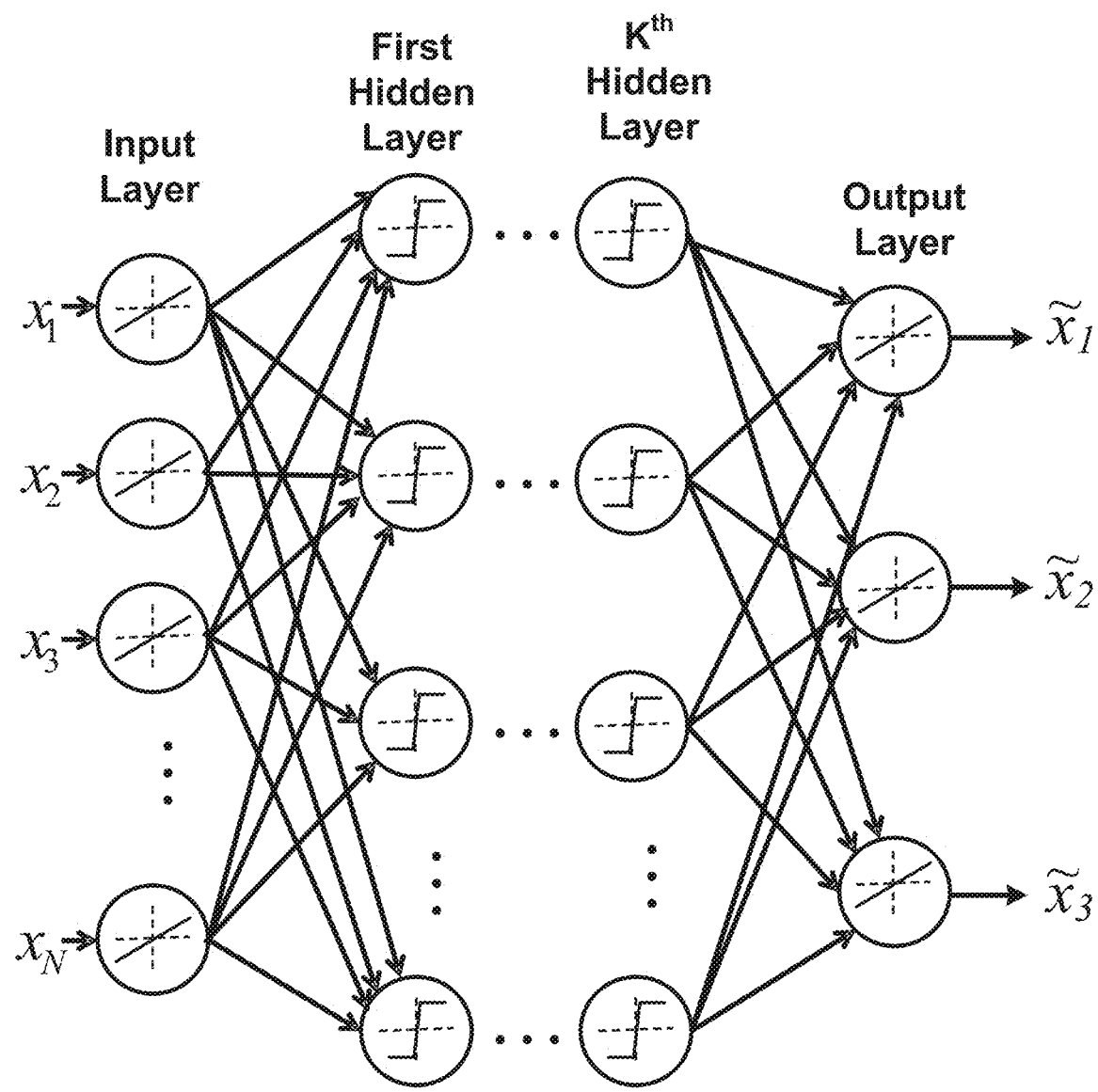
FIG. 17 shows a diagram of the DL network, according to one implementation.

FIG. 17 shows an example of the inter-connections between layers in the DL network 135. The DL network 135 can include fully connected, convolutional, and the pooling layer, all of which are explained below. In certain preferred implementations of the DL network 135, convolutional layers are placed close to the input layer, whereas fully connected layers, which perform the high-level reasoning, are place further down the architecture towards the loss function. Pooling layers can be inserted after convolutions and provide a reduction lowering the spatial extent of the filters, and thus the amount of learnable parameters. Activation functions are also incorporated into various layers to introduce nonlinearity and enable the network to learn complex predictive relationships. The activation function can be a saturating activation functions (e.g., a sigmoid or hyperbolic tangent activation function) or rectified activation function (e.g., the Rectified Linear Unit (ReLU) applied in the first and second examples discussed above). The layers of the DL network 135 can also incorporate batch normalization, as also exemplified in the first and second examples discussed above.

FIG. 17 shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity.

The nodes in an ANN can be referred to as neurons (or as neuronal nodes), and the neurons can have inter-connections between the different layers of the ANN system. The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can further be defined as a composition of other functions. This can be conveniently represented as a network structure, with arrows depicting the dependencies between variables, as shown in FIG. 17. For example, the ANN can use a nonlinear weighted sum, wherein $m(x)=K(\Sigma_i w_i n_i(x))$, where K (commonly referred to as the activation function) is some predefined function, such as the hyperbolic tangent.

In FIG. 17, the neurons (i.e., nodes) are depicted by circles around a threshold function. For the non-limiting example shown in FIG. 17, the inputs are depicted as circles around a linear function, and the arrows indicate directed connections between neurons.

Figure 18:
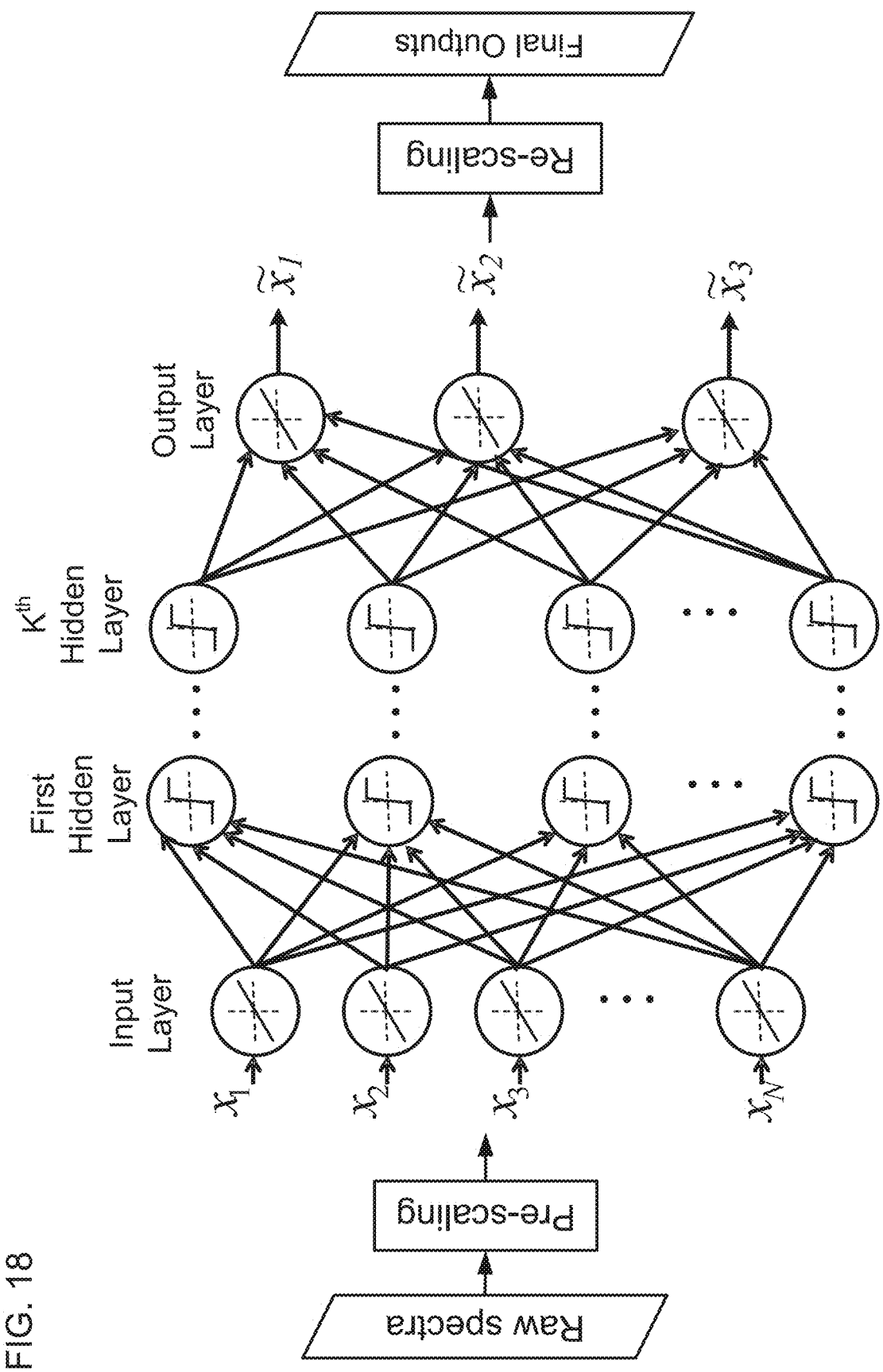
FIG. 18 shows a flow diagram of the DL network with pre-scaling of the inputs and re-scaling of the outputs, according to one implementation.

FIG. 18 shows an alternative implementation in which the network 135 is augmented to include pre-scaling the inputs prior to the input layer, and re-scaling the outputs after the output layer. This augmentation can provide a more robust implementation with more consistent results. It is a good practice to scale the input and the target output before training an ANN. For example, the input can be linearly transformed so that the minimum and maximum values of each input in the training data fall in the range of −1 to 1. Alternatively, the input can be linearly transformed so that each input has a mean of zero and a standard deviation of one. Similarly, regarding the re-scaling of the output, the target output can transformed for training, and then the inverse transform is applied to the output of the trained network to return the output values to their original target range.

In addition to the above described scaling of the input and output values prior to training, in certain implementations, the input data can be pre-scaled by applying a scaling to the 'x-axis' of the raw spectra to generate the input data. This 'x-axis' scaling is performed achieves two favorable results. First, due to manufacturing process variation, the raw spectra can vary substantially in the positions of the features, this scaling makes the process robust against this variation. Second, by performing this scaling, the process becomes more robust to future changes in manufacturing process or electronics settings, such as changes in the clock rate, for example. In view of this 'x-axis' scaling, the network does not need to be re-trained, if, for example, a change in the clock rate setting stretches or compresses the 'x-axis' of the measured spectra. By scaling the 'x-axis' so that the features generally occur over a narrower range of input space, the number of input and hidden neurons can be reduced without sacrificing accuracy. This also reduces the training time and the amount of training data that is needed to achieve good performance.

Figure 19A:
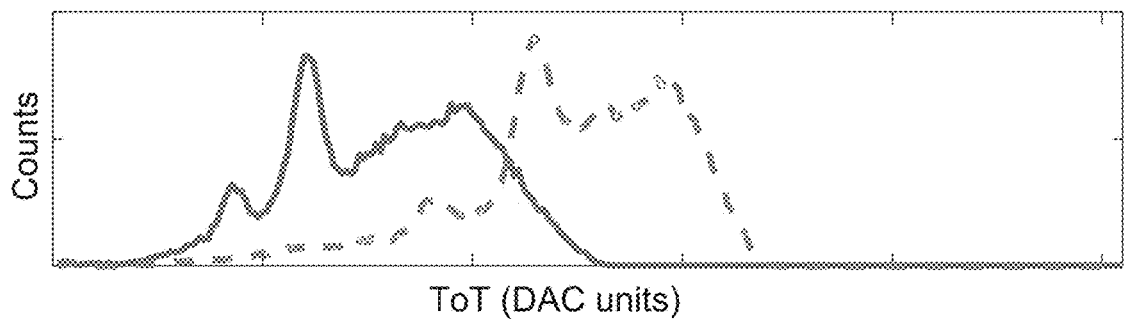
FIG. 19A shows a plot of measured spectra prior to x-axis scaling, according to one implementation.
Figure 19B:
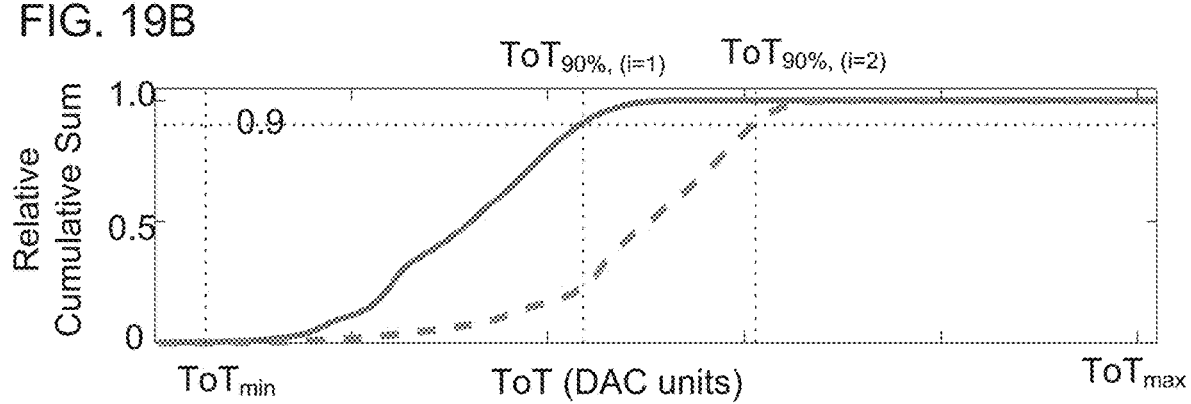
FIG. 19B shows a plot of the cumulative sums of the spectra from FIG. 19A, according to one implementation.
Figure 19C:
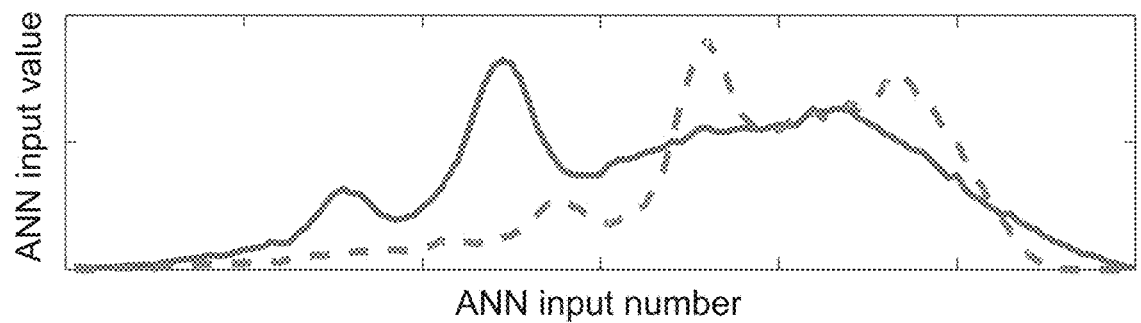
FIG. 19C shows a plot of measured spectra after x-axis scaling, according to one implementation.

FIGS. 19A-C show a non-limiting example for x-axis re-scaling. In FIG. 19A, two examples of raw input spectra are provided with different x-axis scaling, which give an indication of the range over which the spectra might vary. One way to apply this 'x-axis' scaling is described here, but other methods can be used as would be understood by a person of ordinary skill in the art. In this example case, the input to the ANN are Lu-176 spectra, and the outputs are ToT values corresponding to specific energies for each spectra. First, a single value, $ToT_{min}$, is identified. Here, $ToT_{min}$ is defined as the values below which there is apparently little or no variation in the all the measured spectra (e.g., this value could be set to the minimum ToT value in the measurements). In certain implementations, a second value, $ToT_{max}$, can be identified as the maximum value of possible ToT measurements.

Next, the relative cumulative sum (i.e. the cumulative sum normalized so that the maximum value is one) is calculated for each spectrum, as shown in FIG. 19B. Then, for each spectrum the first ToT value is defined as the value for which the relative cumulative sum is greater than or equal to 0.90. This values is called $ToT_{90\%\ (i)}$, wherein the subscript i represents a spectrum index. Then a maximum ToT value is calculated for each spectrum ($TOT_{max(i)}$) by multiplying $ToT_{90\%\ (i)}$ by a constant value (such as 1.20) and rounding to the nearest integer value. For each spectrum, a scale factor, $ToT_{scalefactor(i)} = ToT_{max}/TOT_{max(i)}$ is then calculated. The original target output data (representing ToT values of specific energies) are then multiplied by the scale factor to generate scaled target output, as shown in FIG. 19C. This scale factor for each spectrum is saved in memory, so that it can be used to re-scale the output of the ANN to generate the final output values. The 'x-axis' scaled input data (see FIG. 19C) are then generated by linearly interpolating each original spectrum (FIG. 19A) at N values (where N is equal to the number of neurons in the input layer) linearly spaced from $ToT_{min}$ to $ToT_{max(i)}$.

Figure 21A:
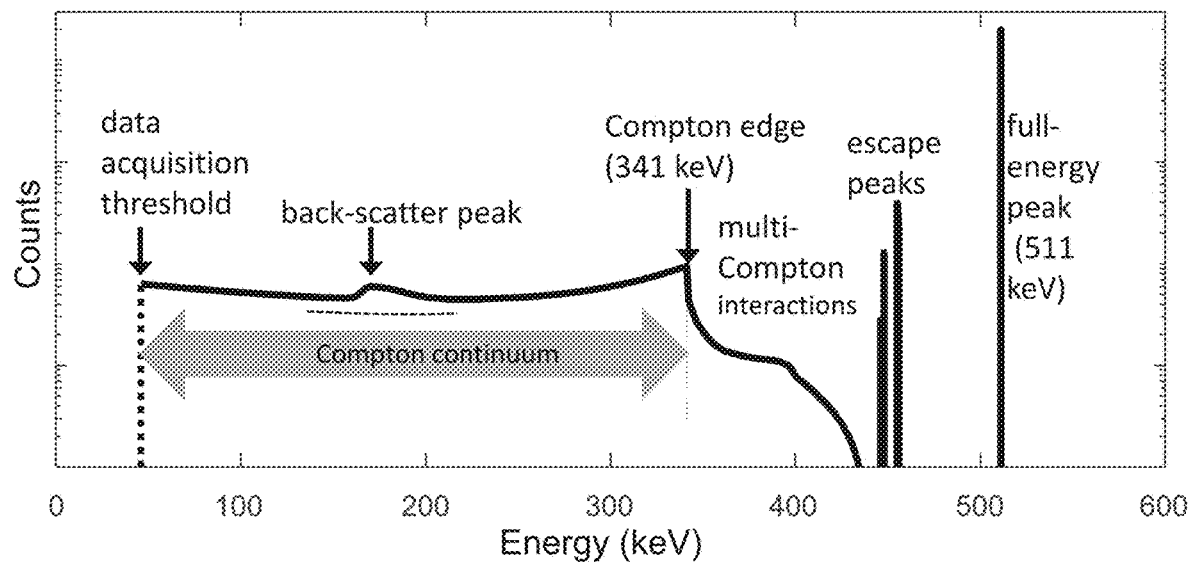
FIG. 21A shows a plot of absorbed radiation contributed to by the various scattering processes represented in FIG. 20, when the detector has perfect energy resolution.
Figure 21B:
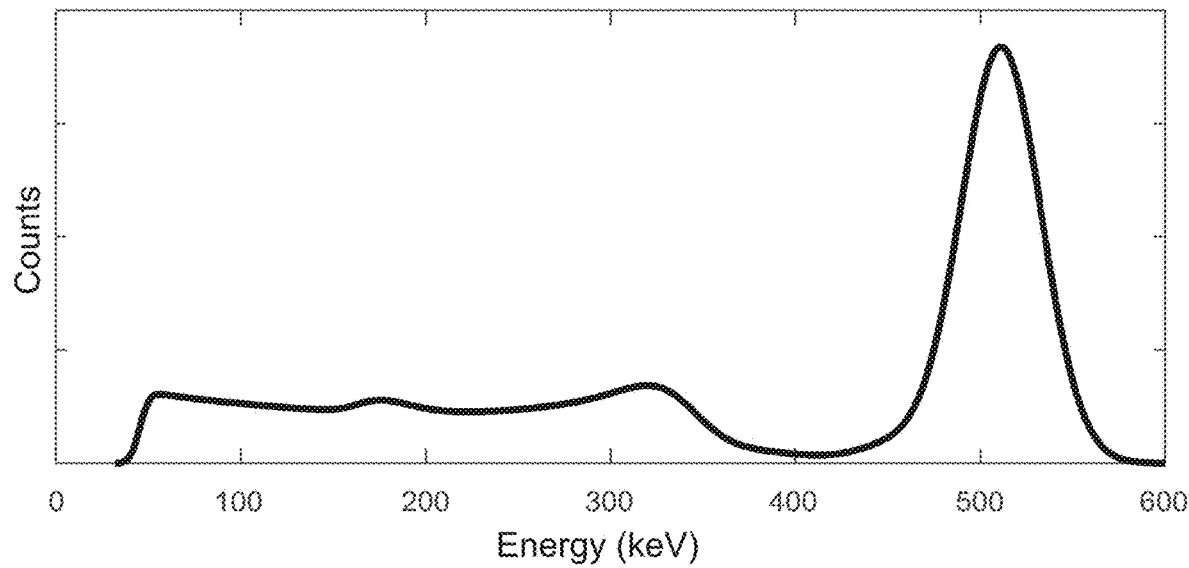
FIG. 21B shows a plot of absorbed radiation contributed to by the various scattering processes represented in FIG. 20, when the detector has finite energy resolution.

The above implementations, of method 100 are illustrated mostly using spectra of Lu-176. The Lu-176 spectra are advantageous for non-linear energy calibrations because they exhibit numerous discrete and continuous spectral features. However, spectra from single-peak spectra such as Ge-68 can also generate discrete and continuous spectral features due to Compton scattering and other physical processes in the detector crystals. The features can include a Compton back scatter peak, a Compton edge, and various escaped peaks, as illustrated in FIGS. 20, 21A, and 21B. FIG. 20 shows a schematic diagram of various physical processes arising from a single-energy radiation source. Here, Ge-68 emits gamma rays at 511 keV. However, backscatter from the crystal at the top of the ring is shown being absorbed by the detector in the lower left region of the ring. Further, FIG. 20 shows gamma ray energy being absorbed due to multi-Compton scattering and energy being absorbed in the presence of X-ray escape. FIG. 21A shows an absorption spectrum arising from the detection of 511 keV gamma rays emitted from Ge-68, including various spectral features corresponding to the above-noted scattering processes. In FIG. 21A, a logarithmic scale is used for the vertical and the absorption spectrum is illustrated under the assumption of perfect detector resolution in order better resolve the various features. In FIG. 21B, a linear scale is used for the vertical axis, and a finite detector resolution is assumed. Even though, Ge-68 emits gamma rays having only a single energy, the absorbed energy shows many different spectral features (e.g., due to the back-scatter peak and the Compton edge). Thus, even when the radiation source emits only a single energy of radiation, the detection process can result in many spectral features. In view of this, the methods described herein can be used with spectra from radiation sources like Ge-68, which emit radiation at a single energy, in addition to being used with radiation sources like Lu-176, which emit radiation at multiple energies.

A physics-based model of the various scattering processes shown in FIGS. 20, 21A, and 21B can be applied using known analytical and numerical expressions for the scattering processes. Thus, either the DL network implementation or the physics-based model implementation can be applied to an absorption spectrum obtained from a radiation source emitting at only one or two energies.

Figure 22:
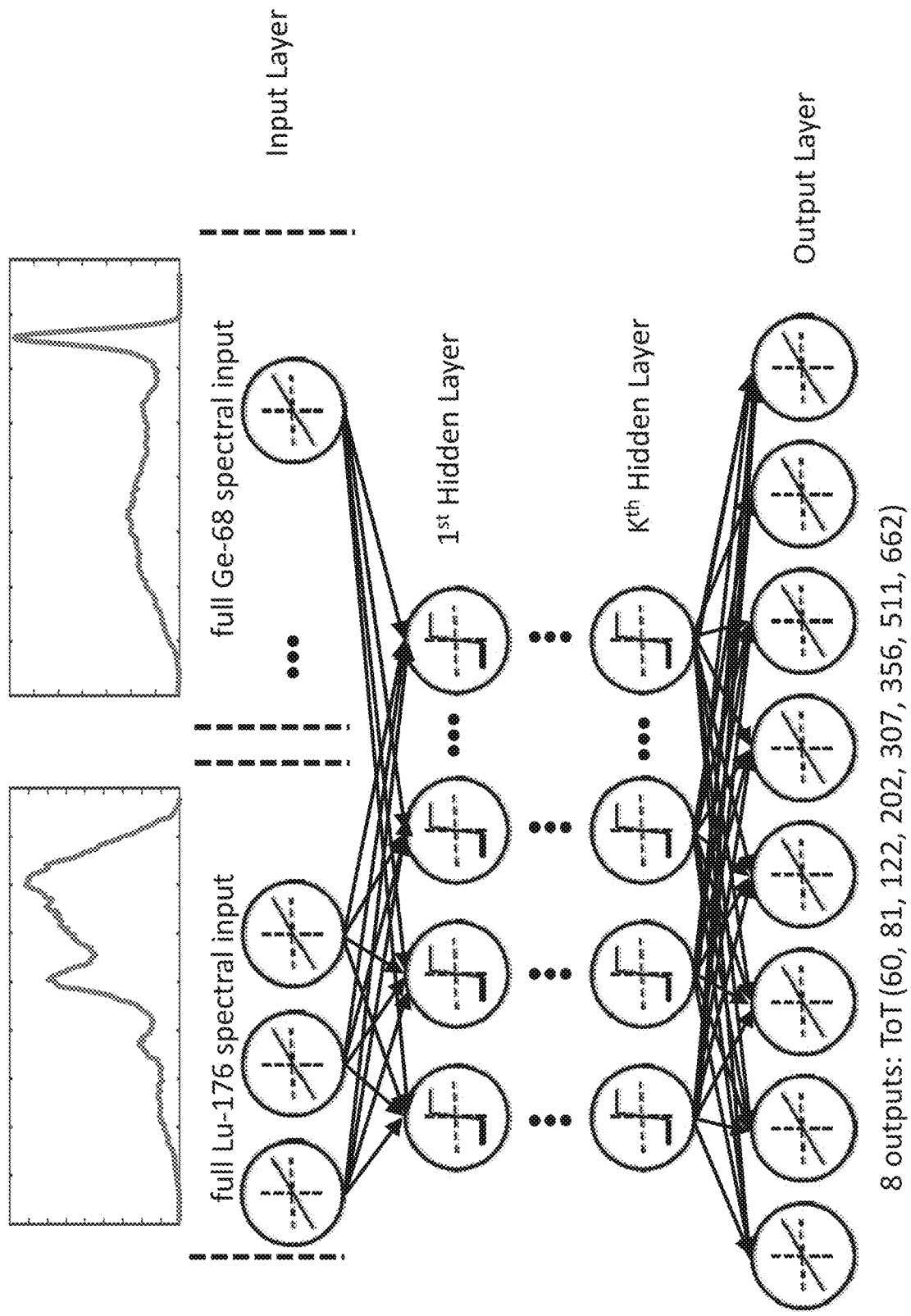
FIG. 22 shows a diagram of single network approach to generating an energy calibration, according to one implementation.

FIG. 22 shows an implementation in which the DL network 135 receives as inputs two full spectra (e.g., a first spectrum corresponding to Lu-176 and a second spectrum corresponding to Ge 68). In this implementation, eight outputs are generated for the TOT values corresponding to energies of 60, 81, 122, 202, 307, 356, 511, and 662 keV. Due to the large number of inputs, the number of nodes in the network can be larger, which makes the training of the network slower.

Figure 23:
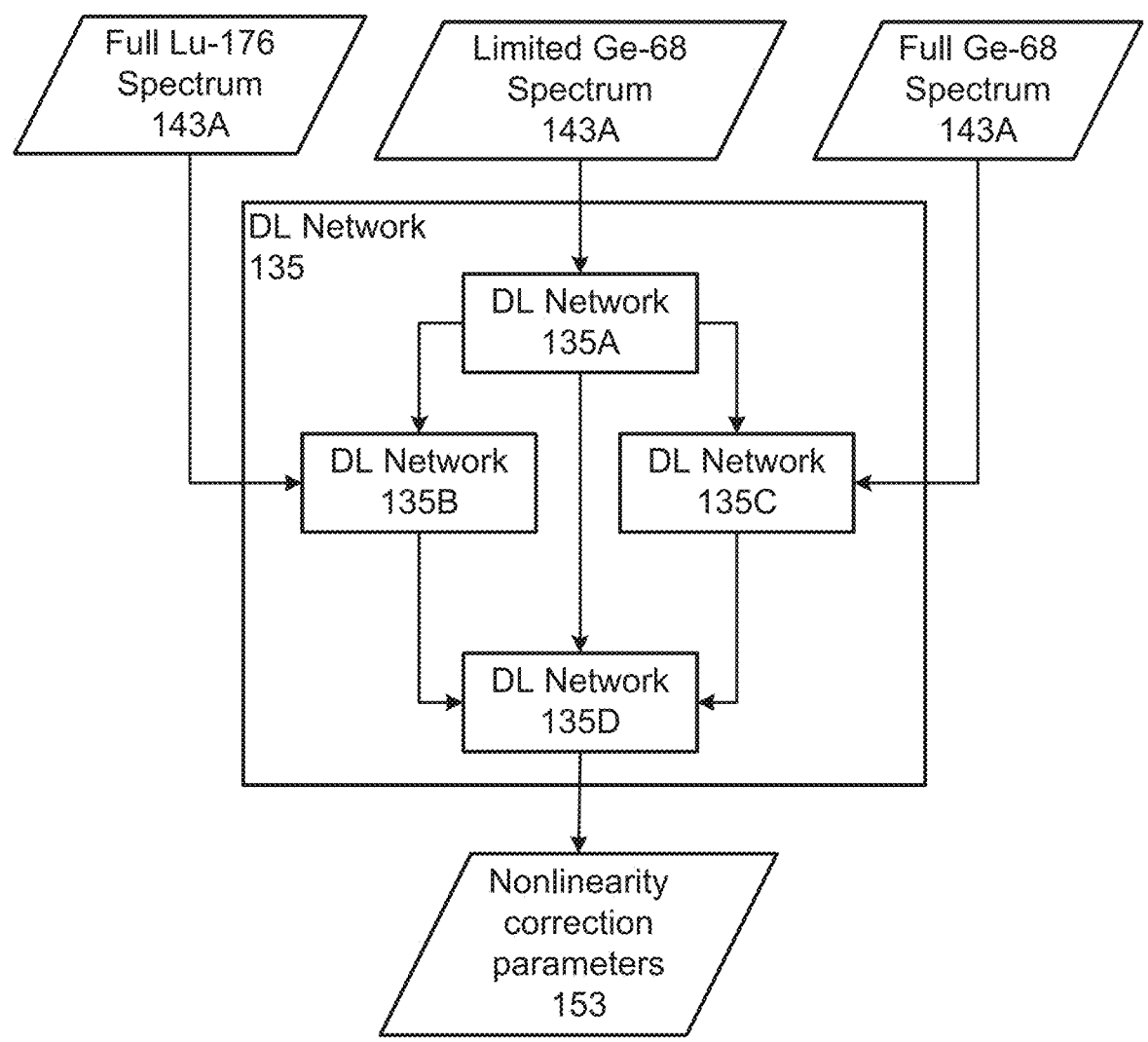
FIG. 23 shows a flow diagram of subdivided network approach to generating an energy calibration, according to one implementation.
Figure 24A:
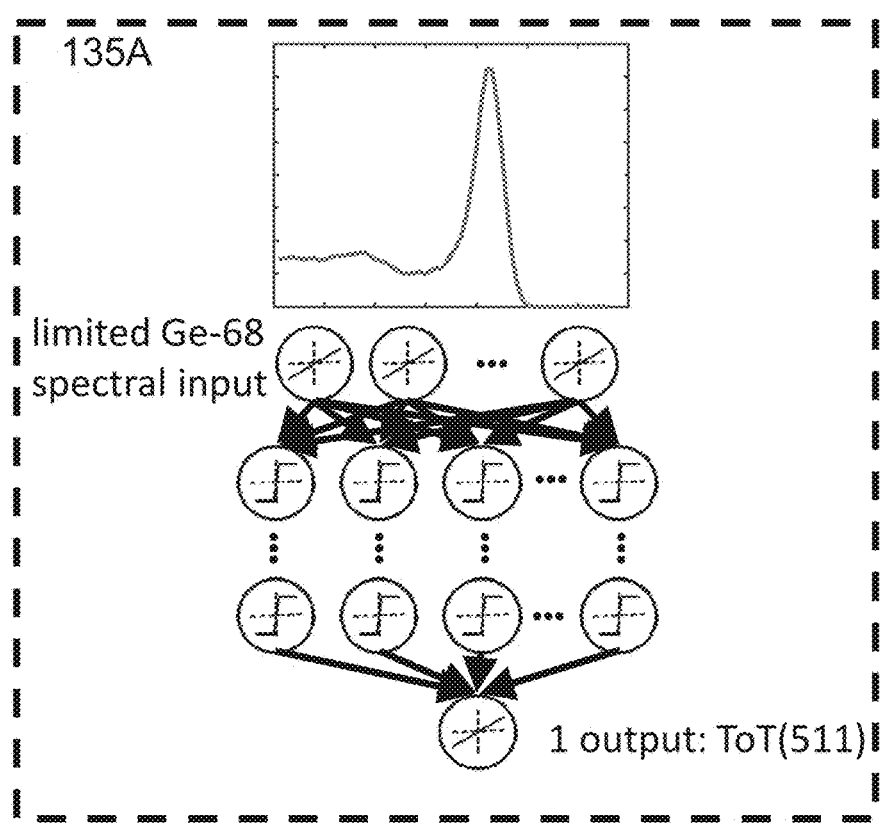
FIG. 24A shows a diagram of a first subdivided network in the subdivided network approach to generating an energy calibration, according to one implementation.
Figure 24B:
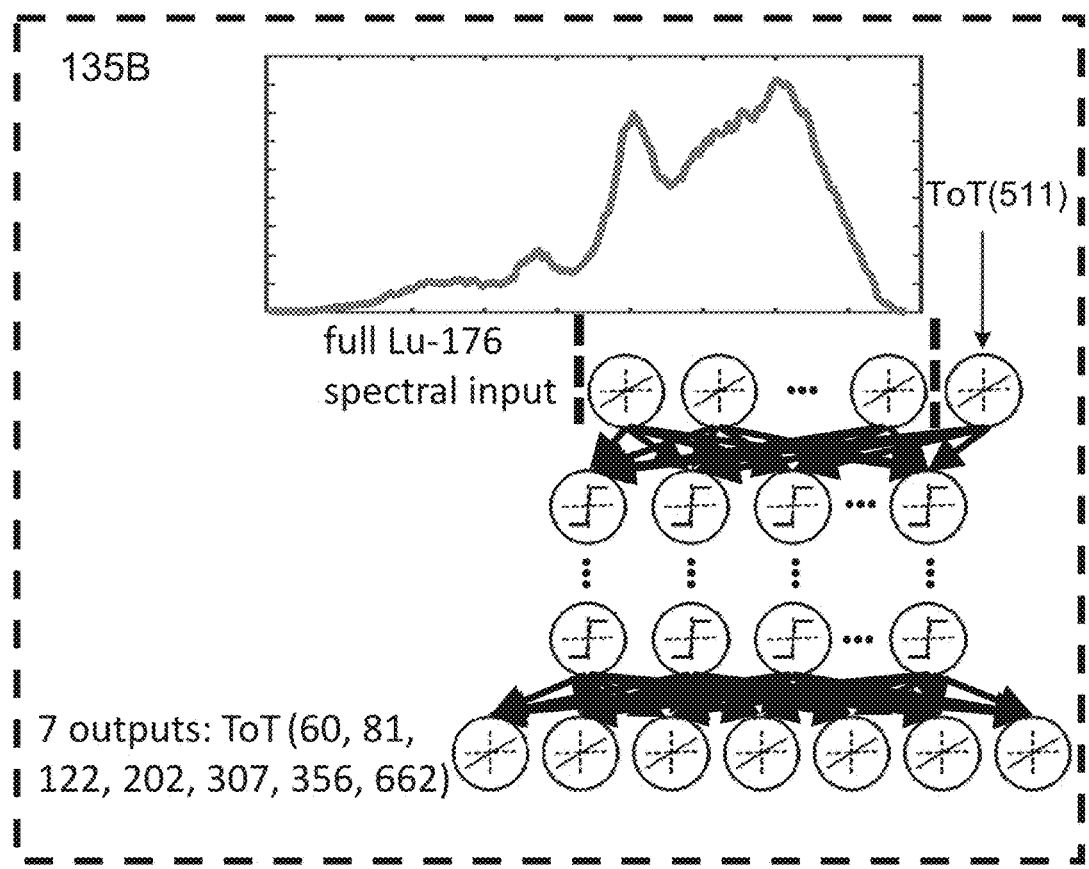
FIG. 24B shows a diagram of a second subdivided network in the subdivided network approach, according to one implementation.
Figure 24C:
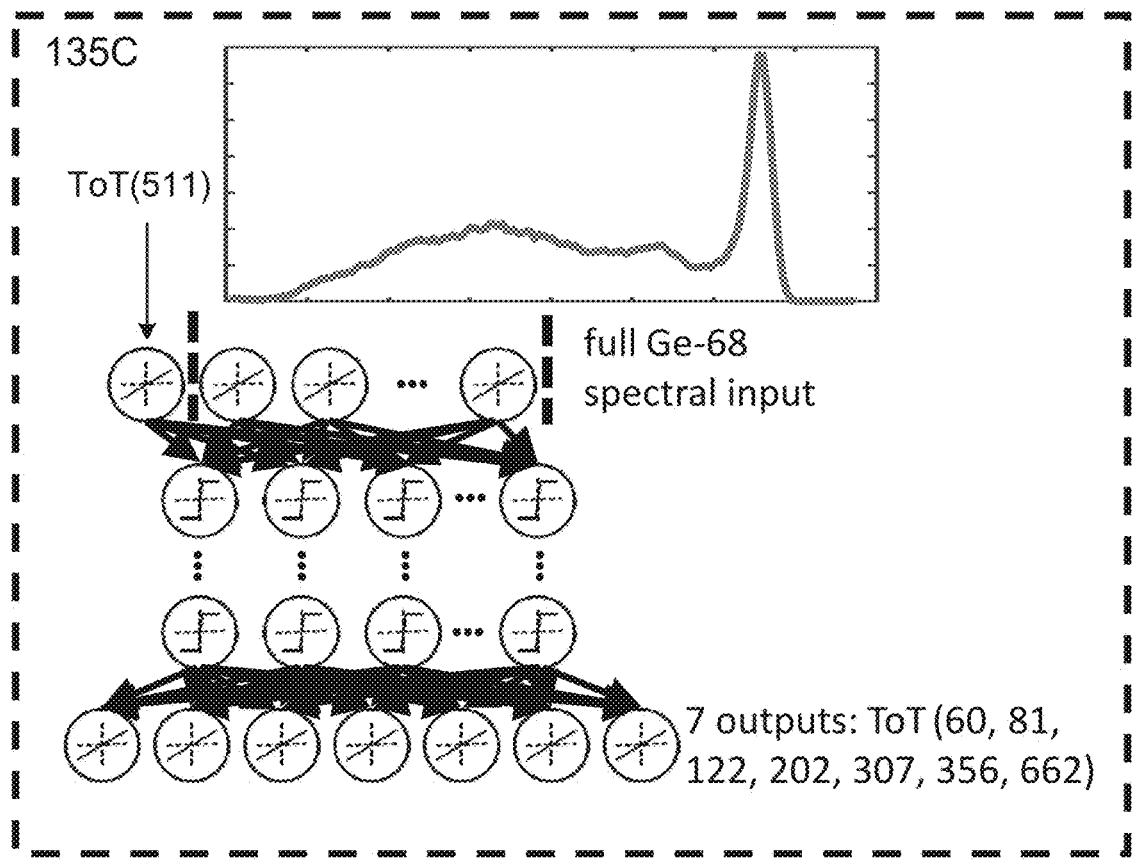
FIG. 24C shows a diagram of a third subdivided network in the subdivided network approach, according to one implementation.
Figure 24D:
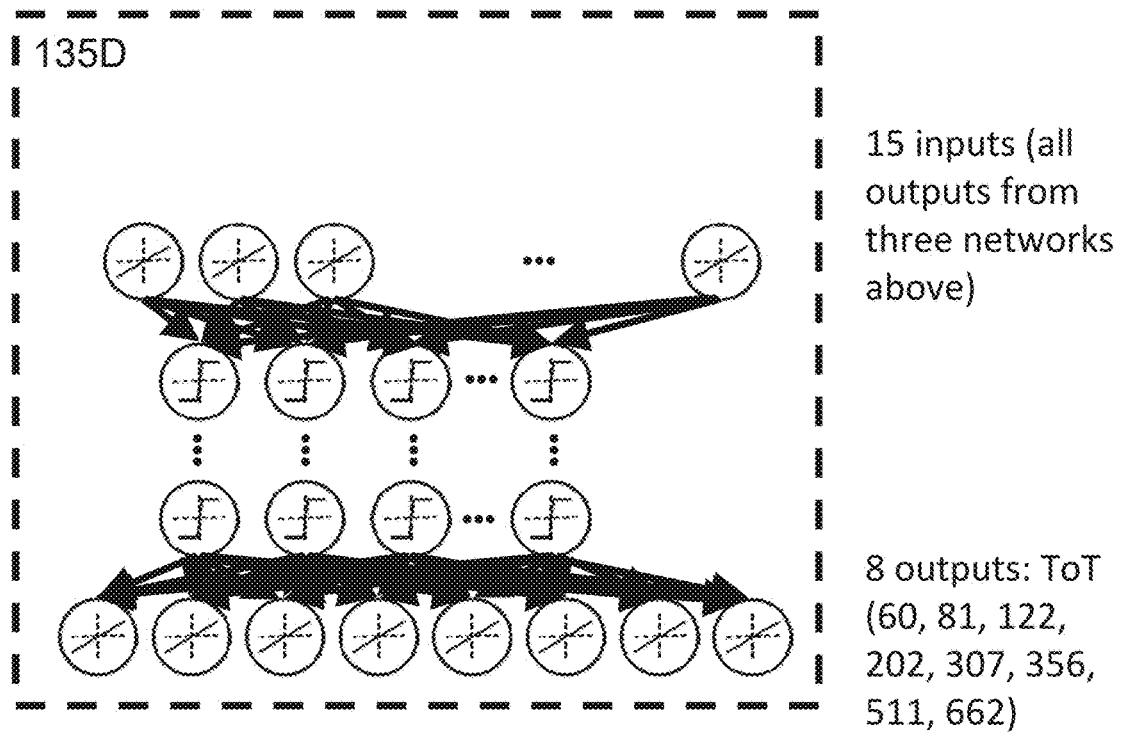
FIG. 24D shows a diagram of a fourth subdivided network in the subdivided network approach, according to one implementation.
Figure 24E:
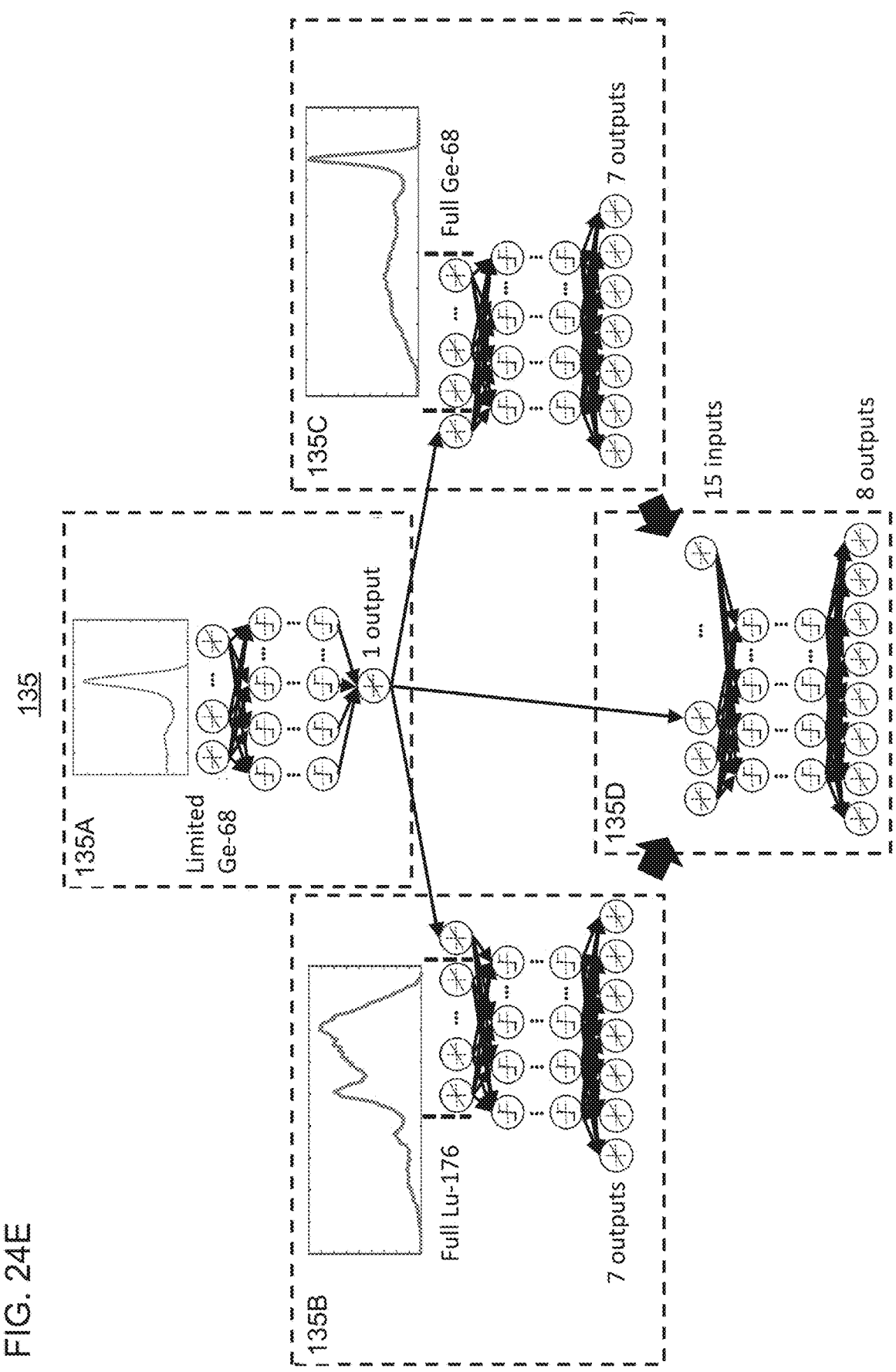
FIG. 24E shows a diagram of which outputs feed into which input in the in the subdivided network approach, according to one implementation.

FIG. 23 shows an alternative implementation in which the DL network 135 is subdivided into a series of smaller DL networks 135A, 135B, 135C, and 135D. Because each of these networks has fewer inputs than the implementation shown in FIG. 22, training the subdivided DL networks 135A, 135B, 135C, and 135D can be performed faster. Further, implementing each of the subdivided DL networks 135A, 135B, 135C, and 135D can be faster, resulting in faster performance of total DL network 135, which includes performance of all of the subdivided DL networks 135A, 135B, 135C, and 135D. FIGS. 23 and 24A show that a portion of the Ge-68 can be used to determine the ToT value corresponding to the 511 keV peak. FIGS. 23 and 24B show that the full Lu-176 spectrum together with the ToT value corresponding to the 511 keV peak from DL network 135A can be applied as inputs to DL network 135B to generate seven outputs, corresponding to the TOT values corresponding to energies of 60, 81, 122, 202, 307, 356, and 662 keV. Similarly, FIGS. 23 and 24C show that the full Ge-68 spectrum together with the ToT value corresponding to the 511 keV peak from DL network 135A can be applied as inputs to DL network 135C to generate seven outputs, corresponding to the TOT values corresponding to energies of 60, 81, 122, 202, 307, 356, and 662 keV. Finally, a combination of the outputs from each of DL networks 135A, 135B, and 135C are applied as inputs to the DL network 135D, which generates eight outputs corresponding to the TOT values corresponding to energies of 60, 81, 122, 202, 307, 356, 511, and 662 keV. FIG. 24 provides another view of how the subdivided DL networks 135A, 135B, 135C, and 135D are combined and interrelated to generate the TOT values corresponding to energies of 60, 81, 122, 202, 307, 356, 511, and 662 keV. This is one example, of how variations in the implementation of the DL network 135 can be used to accelerate performance of both training and use of the DL network 135 to generate energy calibrations.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An ionizing radiation detection apparatus, comprising:
processing circuitry configured to
obtain calibration data including a calibration spectrum of ionizing radiation incident at a detector when the detector is irradiated from a calibration source, the calibration spectrum representing counts or intensity of the ionizing radiation as a function of measured signals that, over the calibration spectrum, are monotonically related to energies of the ionizing radiation, and
determine an energy calibration by applying the calibration spectrum to at least one of an input to a neural network and an input to a physics-based model of a spectrum of the calibration source,
acquire emission data of the ionizing radiation incident at the detector, the emission data comprising acquired signals that, over the calibration spectrum, are monotonically related to energies of the ionizing radiation, and
apply the energy calibration to the acquired signals to generate energies of detection events of the emission data.

2. The apparatus according to claim 1, wherein the ionizing radiation comprises gamma rays.

3. The apparatus according to claim 1, wherein, when the calibration spectrum is applied as the input to the neural network,
the neural network has been trained using a training dataset including input data and target data, the input data comprising radiation spectra acquired using the calibration source, and the target data comprising values of a mapping between measured signals and energies, the values of the mapping being derived using a second calibration method, which is different from the first calibration method.

4. The apparatus according to claim 1, wherein, when the calibration spectrum is applied as the input to the physics-based model of the calibration source, the processing circuitry is further configured to
adjust free parameters of the physics-based model to optimize a fit between the calibration spectrum and a calculated spectrum generated by the physics-based model, wherein the free parameters of the physics-based model include parameters of the energy calibration.

5. The apparatus according to claim 1, wherein the calibration source includes no more than one radioactive isotope, which produces a spectrum having a plurality of structures as a function of absorbed radiation energy.

6. The apparatus according to claim 5, wherein the calibration source is intrinsic to the detector material and/or is lutetium isotope 176 (Lu-176).

7. The apparatus according to claim 5, wherein the calibration data includes at most one other spectrum acquired from another calibration source, the one other calibration source predominantly emitting gamma rays at one energy peak.

8. The apparatus according to claim 7, wherein the no more than one radioactive isotope of the calibration source is lutetium isotope 176 (Lu-176) that is intrinsic to a lutetium based scintillator crystal and the one other calibration source comprises a radioactive isotope selected from the group of cesium isotope 137 and germanium isotope 68.

9. The apparatus according to claim 3, wherein the processing circuitry is further configured to
obtain the training dataset, wherein the respective radiation spectra of the input data are paired with the respective values of the mappings of the target data, the values of the mappings being parameters that relate measured signals to energies, use the neural network to output values of the mappings from the respective calibration spectra by applying a given calibration spectrum to the neural network, and train the neural network by iteratively adjusting weighting coefficients the neural network to optimize a value of a loss function, the loss function measuring a disagreement between the output values of the mappings from the neural network and the corresponding values of the mappings from the target data.

10. The apparatus according to claim 1, wherein the measured signal is a time-over-threshold signal or a signal from a detector having a nonlinear response of the measured signal output from the detector relative to an intensity of radiation incident on the detector.

11. The apparatus according to claim 1, wherein the processing circuitry is further configured to sum energies generated for multi-channel detections in the emission data to calculate total energies for each of the multi-channel detections, and generate corrected energies in the emission data, and reconstruct a positron emission tomography (PET) image from the emission data.

12. The apparatus according to claim 1, wherein the processing circuitry is further configured to acquire emission data using a medical imaging scanner, and the medical imaging scanner is selected from (i) a positron emission tomography scanner, (ii) a single photon emission computed tomography scanner, and (iii) an X-ray computed tomography scanner.

13. The apparatus according to claim 9, wherein, when the values of the mappings are the values of measured signals at the known energies, the known energies are peaks in respective energy spectra corresponding to a plurality of isotopes, and the loss function represents a difference between values of the mappings output from the neural network and the values of the mappings from the target data, which are values of peaks in measured energy spectra corresponding to the plurality of isotopes.

14. The apparatus according to claim 9, wherein the processing circuitry is further configured to augment the training dataset to generate an augmented training dataset, and, to augment the training dataset, the processing circuitry is further configured to determine additional parameters that relate measured signals to energies, the additional parameters lying within an extended distribution that is larger than a distribution of the parameters corresponding to the target data, map energies to additional measured signals based on the additional parameters, generate an augmented training dataset including the additional measured signals and the measured signals of the training dataset, wherein the processing circuitry is further configured to train the neural network using the augmented training dataset, which includes the training dataset.

15. A method, comprising:

obtaining calibration data including a calibration spectrum of ionizing radiation incident at a detector when the detector is irradiated from a calibration source, the calibration spectrum representing counts or intensity of the ionizing radiation as a function of measured signals that, over the calibration spectrum, are monotonically related to energies of the ionizing radiation;

determining an energy calibration by applying the calibration spectrum to at least one of an input to a neural network and an input to a physics-based model of the calibration source, acquiring emission data of the ionizing radiation incident at the detector, the emission data comprising acquired signals that, over the calibration spectrum, are monotonically related to energies of the ionizing radiation, and applying the energy calibration to the acquired signals to generate energies of detection events of the emission data.

16. The method according to claim 15, wherein the ionizing radiation comprises gamma rays.

17. The method according to claim 15, wherein, when the calibration spectrum is applied as the input to the neural network, the step of obtaining the neural network further includes that the neural network has been trained using a training dataset including input data and target data, the input data comprising radiation spectra acquired using the calibration source, and the target data comprising values of a mapping between measured signals and energies, the values of the mapping being derived using a second calibration method, which is different from the first calibration method.

18. The method according to claim 15, wherein, when the calibration spectrum is applied as the input to the physics-based model of the calibration source, the method further comprises adjusting free parameters of the physics-based model to optimize a fit between the calibration spectrum and a calculated spectrum generated by the physics-based model, wherein the free parameters of the physics-based model include parameters of the energy calibration.

19. The method according to claim 15, wherein the step of obtaining the calibration data further includes that the calibration source includes no more than one radioactive isotope, which produces a spectrum having a plurality of structures as a function of absorbed radiation energy.

20. A non-transitory computer-readable storage medium including executable instructions, which when executed by circuitry, cause the circuitry to perform the method according to claim 15.

* * * * *